United States Patent
Bloch (10) Patent No.: US 11,314,936 B2
(45) Date of Patent: Apr. 26, 2022

(54) SYSTEM AND METHOD FOR ASSEMBLING A RECORDED COMPOSITION

(71) Applicant: JBF Interlude 2009 LTD, Tel Aviv (IL)

(72) Inventor: Jonathan Bloch, Brooklyn, NY (US)

(73) Assignee: JBF Interlude 2009 LTD, Tel Aviv (IL)

( * ) Notice: Subject to any disclaimer, the term of this patent is extended or adjusted under 35 U.S.C. 154(b) by 56 days.

(21) Appl. No.: 14/884,285

(22) Filed: Oct. 15, 2015

(65) Prior Publication Data

US 2016/0170948 A1    Jun. 16, 2016

Related U.S. Application Data

(63) Continuation of application No. 12/706,721, filed on Feb. 17, 2010, now Pat. No. 9,190,110.

(30) Foreign Application Priority Data

May 12, 2009    (IL) .......................................... 198717

(51) Int. Cl.
*G06F 3/048*    (2013.01)
*G10H 1/00*    (2006.01)
(Continued)

(52) U.S. Cl.
CPC ............ *G06F 40/197* (2020.01); *G06F 3/048* (2013.01); *G10H 1/0025* (2013.01); *G10H 1/368* (2013.01);
(Continued)

(58) Field of Classification Search
CPC ..... G11B 27/034; G11B 27/00; G11B 27/036; G11B 27/031; G11B 27/34; G06F 3/0482; G06F 3/048; G06F 17/30017; G06F 3/04817; G06F 17/30056; G06F 17/30781; G06F 17/30849; G06F 17/2288;
(Continued)

(56) References Cited

U.S. PATENT DOCUMENTS 4,569,026 A    2/1986 Best
5,137,277 A    8/1992 Kitaue
(Continued)

FOREIGN PATENT DOCUMENTS

CA    2639491    3/2010
DE    004038801    6/1992
(Continued)

OTHER PUBLICATIONS

U.S. Appl. No. 15/356,913, Systems and Methods for Real-Time Pixel Switching, filed Nov. 21, 2016.
(Continued)

*Primary Examiner* — Stephen S Hong
*Assistant Examiner* — Ahamed I Nazar
(74) *Attorney, Agent, or Firm* — Goodwin Procter LLP (57) ABSTRACT

A system and method for assembling segments of recorded music or video from among various versions or variations of a recording, into a new version or composition, such that a first segment of a first version of a recorded work is attached to a segment of a second segment of a second version of the recorded work, to create a new version of the recorded work.

20 Claims, 5 Drawing Sheets

(51) Int. Cl.
*G11B 27/034* (2006.01)
*G11B 27/036* (2006.01)
*G11B 27/34* (2006.01)
*G11B 27/031* (2006.01)
*G06F 40/197* (2020.01)
*G10H 1/36* (2006.01)
*G10H 7/00* (2006.01)

(52) U.S. Cl.
CPC ........... *G10H 7/008* (2013.01); *G11B 27/031* (2013.01); *G11B 27/034* (2013.01); *G11B 27/036* (2013.01); *G11B 27/34* (2013.01); G10H 2210/125 (2013.01)

(58) Field of Classification Search
CPC ................. G10H 1/0025; G10H 7/008; G10H 2210/125; G10H 1/368
See application file for complete search history.

(56) References Cited

U.S. PATENT DOCUMENTS

| | | | |
|---|---|---|---|
| 5,161,034 A | 11/1992 | Klappert | |
| 5,568,602 A | 10/1996 | Callahan et al. | |
| 5,568,603 A | 10/1996 | Chen et al. | |
| 5,597,312 A | 1/1997 | Bloom et al. | |
| 5,607,356 A | 3/1997 | Schwartz | |
| 5,610,653 A | 3/1997 | Abecassis | |
| 5,636,036 A | 6/1997 | Ashbey | |
| 5,676,551 A | 10/1997 | Knight et al. | |
| 5,715,169 A | 2/1998 | Noguchi | |
| 5,734,862 A | 3/1998 | Kulas | |
| 5,745,738 A | 4/1998 | Ricard | |
| 5,751,953 A | 5/1998 | Shiels et al. | |
| 5,754,770 A | 5/1998 | Shiels et al. | |
| 5,801,694 A * | 9/1998 | Gershen | G10H 1/0025 715/203 |
| 5,818,435 A | 10/1998 | Kozuka et al. | |
| 5,848,934 A | 12/1998 | Shiels et al. | |
| 5,887,110 A | 3/1999 | Sakamoto et al. | |
| 5,894,320 A | 4/1999 | Vancelette | |
| 5,956,037 A | 9/1999 | Osawa et al. | |
| 5,983,190 A | 11/1999 | Trower, II et al. | |
| 6,067,400 A | 5/2000 | Saeki et al. | |
| 6,122,668 A | 9/2000 | Tena et al. | |
| 6,128,712 A | 10/2000 | Hunt et al. | |
| 6,191,780 B1 | 2/2001 | Martin et al. | |
| 6,222,925 B1 | 4/2001 | Shiels et al. | |
| 6,240,555 B1 | 5/2001 | Shoff et al. | |
| 6,298,020 B1 | 10/2001 | Kumagami | |
| 6,298,482 B1 | 10/2001 | Seidman et al. | |
| 6,460,036 B1 | 10/2002 | Herz | |
| 6,535,639 B1 | 3/2003 | Uchihachi et al. | |
| 6,657,906 B2 | 12/2003 | Martin | |
| 6,698,020 B1 | 2/2004 | Zigmond et al. | |
| 6,728,477 B1 | 4/2004 | Watkins | |
| 6,740,802 B1 * | 5/2004 | Browne, Jr. | G10H 1/0025 84/609 |
| 6,771,875 B1 | 8/2004 | Kunieda et al. | |
| 6,801,947 B1 | 10/2004 | Li | |
| 6,947,966 B1 | 9/2005 | Oko, Jr. et al. | |
| 7,085,844 B2 | 8/2006 | Thompson | |
| 7,155,676 B2 | 12/2006 | Land et al. | |
| 7,231,132 B1 | 6/2007 | Davenport | |
| 7,296,231 B2 | 11/2007 | Loui et al. | |
| 7,310,784 B1 | 12/2007 | Gottlieb et al. | |
| 7,379,653 B2 | 5/2008 | Yap et al. | |
| 7,430,360 B2 | 9/2008 | Abecassis | |
| 7,444,069 B1 | 10/2008 | Bernsley | |
| 7,472,910 B1 | 1/2009 | Okada et al. | |
| 7,627,605 B1 | 12/2009 | Lamere et al. | |
| 7,669,128 B2 | 2/2010 | Bailey et al. | |
| 7,694,320 B1 | 4/2010 | Yeo et al. | |
| 7,779,438 B2 | 8/2010 | Davies | |
| 7,787,973 B2 | 8/2010 | Lambert | |
| 7,917,505 B2 | 3/2011 | van Gent et al. | |
| 8,024,762 B2 | 9/2011 | Britt | |
| 8,046,801 B2 | 10/2011 | Ellis et al. | |
| 8,065,710 B2 | 11/2011 | Malik | |
| 8,151,139 B1 | 4/2012 | Gordon | |
| 8,176,425 B2 | 5/2012 | Wallace et al. | |
| 8,190,001 B2 | 5/2012 | Bernsley | |
| 8,202,167 B2 | 6/2012 | Ackley et al. | |
| 8,276,058 B2 | 9/2012 | Gottlieb et al. | |
| 8,281,355 B1 | 10/2012 | Weaver et al. | |
| 8,321,905 B1 | 11/2012 | Streeter et al. | |
| 8,350,908 B2 | 1/2013 | Morris et al. | |
| 8,600,220 B2 | 12/2013 | Bloch et al. | |
| 8,612,517 B1 | 12/2013 | Yadid et al. | |
| 8,626,337 B2 | 1/2014 | Corak et al. | |
| 8,646,020 B2 | 2/2014 | Reisman | |
| 8,650,489 B1 | 2/2014 | Baum et al. | |
| 8,667,395 B2 | 3/2014 | Hosogai et al. | |
| 8,750,682 B1 | 6/2014 | Nicksay et al. | |
| 8,752,087 B2 | 6/2014 | Begeja et al. | |
| 8,826,337 B2 | 9/2014 | Issa et al. | |
| 8,860,882 B2 | 10/2014 | Bloch et al. | |
| 8,930,975 B2 | 1/2015 | Woods et al. | |
| 8,977,113 B1 | 3/2015 | Rumteen et al. | |
| 9,009,619 B2 | 4/2015 | Bloch et al. | |
| 9,021,537 B2 | 4/2015 | Funge et al. | |
| 9,082,092 B1 | 7/2015 | Henry | |
| 9,094,718 B2 | 7/2015 | Barton et al. | |
| 9,190,110 B2 | 11/2015 | Bloch | |
| 9,257,148 B2 | 2/2016 | Bloch et al. | |
| 9,268,774 B2 | 2/2016 | Kim et al. | |
| 9,271,015 B2 | 2/2016 | Bloch et al. | |
| 9,363,464 B2 | 6/2016 | Alexander | |
| 9,367,196 B1 | 6/2016 | Goldstein et al. | |
| 9,374,411 B1 | 6/2016 | Goetz | |
| 9,390,099 B1 | 7/2016 | Wang et al. | |
| 9,456,247 B1 | 9/2016 | Pontual et al. | |
| 9,465,435 B1 | 10/2016 | Zhang et al. | |
| 9,473,582 B1 | 10/2016 | Fraccaroli | |
| 9,510,044 B1 | 11/2016 | Pereira et al. | |
| 9,520,155 B2 | 12/2016 | Bloch et al. | |
| 9,530,454 B2 | 12/2016 | Bloch et al. | |
| 9,538,219 B2 | 1/2017 | Sakata et al. | |
| 9,554,061 B1 | 1/2017 | Proctor, Jr. et al. | |
| 9,571,877 B2 | 2/2017 | Lee et al. | |
| 9,607,655 B2 | 3/2017 | Bloch et al. | |
| 9,641,898 B2 | 5/2017 | Bloch et al. | |
| 9,653,115 B2 | 5/2017 | Bloch et al. | |
| 9,653,116 B2 | 5/2017 | Paulraj et al. | |
| 9,672,868 B2 | 6/2017 | Bloch et al. | |
| 9,715,901 B1 | 7/2017 | Singh et al. | |
| 9,736,503 B1 | 8/2017 | Bakshi et al. | |
| 9,792,026 B2 | 10/2017 | Bloch et al. | |
| 9,792,957 B2 | 10/2017 | Bloch et al. | |
| 9,826,285 B1 | 11/2017 | Mishra et al. | |
| 9,967,621 B2 | 5/2018 | Armstrong et al. | |
| 10,070,192 B2 | 9/2018 | Baratz | |
| 10,178,304 B1 | 1/2019 | Tudor et al. | |
| 10,178,421 B2 | 1/2019 | Thomas et al. | |
| 10,187,687 B2 | 1/2019 | Harb et al. | |
| 10,194,189 B1 | 1/2019 | Goetz et al. | |
| 10,257,572 B2 | 4/2019 | Manus et al. | |
| 10,419,790 B2 | 9/2019 | Gersten | |
| 10,460,765 B2 | 10/2019 | Bloch et al. | |
| 10,523,982 B2 | 12/2019 | Oyman | |
| 10,771,824 B1 | 9/2020 | Haritaoglu et al. | |
| 2001/0056427 A1 | 12/2001 | Yoon et al. | |
| 2002/0019799 A1 | 2/2002 | Ginsberg et al. | |
| 2002/0029218 A1 | 3/2002 | Bentley et al. | |
| 2002/0053089 A1 * | 5/2002 | Massey | A63F 13/10 725/135 |
| 2002/0086724 A1 | 7/2002 | Miyaki et al. | |
| 2002/0091455 A1 | 7/2002 | Williams | |
| 2002/0105535 A1 | 8/2002 | Wallace et al. | |
| 2002/0106191 A1 | 8/2002 | Betz et al. | |
| 2002/0120456 A1 | 8/2002 | Berg et al. | |
| 2002/0120931 A1 | 8/2002 | Huber et al. | |
| 2002/0129374 A1 | 9/2002 | Freeman et al. | |
| 2002/0140719 A1 | 10/2002 | Amir et al. | |

(56) References Cited

U.S. PATENT DOCUMENTS

| | | |
|---|---|---|
| 2002/0144262 A1 | 10/2002 | Plotnick et al. |
| 2002/0166440 A1* | 11/2002 | Herberger ............ G11B 27/031 84/625 |
| 2002/0174430 A1 | 11/2002 | Ellis et al. |
| 2002/0177914 A1 | 11/2002 | Chase |
| 2002/0194595 A1 | 12/2002 | Miller et al. |
| 2003/0007560 A1 | 1/2003 | Mayhew et al. |
| 2003/0012409 A1 | 1/2003 | Overton et al. |
| 2003/0020744 A1 | 1/2003 | Ellis et al. |
| 2003/0023757 A1 | 1/2003 | Ishioka et al. |
| 2003/0039471 A1 | 2/2003 | Hashimoto |
| 2003/0069057 A1 | 4/2003 | DeFrees-Parrott |
| 2003/0076347 A1 | 4/2003 | Barrett et al. |
| 2003/0101164 A1 | 5/2003 | Pic et al. |
| 2003/0148806 A1 | 8/2003 | Weiss |
| 2003/0159566 A1 | 8/2003 | Sater et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0009813 A1 | 1/2004 | Wind |
| 2004/0019905 A1 | 1/2004 | Fellenstein et al. |
| 2004/0034711 A1* | 2/2004 | Hughes ............ H04L 29/06027 709/231 |
| 2004/0070595 A1 | 4/2004 | Atlas et al. |
| 2004/0091848 A1 | 5/2004 | Nemitz |
| 2004/0128317 A1 | 7/2004 | Sull et al. |
| 2004/0138948 A1 | 7/2004 | Loomis |
| 2004/0146275 A1 | 7/2004 | Takata et al. |
| 2004/0172476 A1 | 9/2004 | Chapweske |
| 2004/0194128 A1 | 9/2004 | McIntyre et al. |
| 2004/0194131 A1 | 9/2004 | Ellis et al. |
| 2004/0199923 A1 | 10/2004 | Russek |
| 2004/0261127 A1 | 12/2004 | Freeman et al. |
| 2005/0019015 A1 | 1/2005 | Ackley et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2005/0107159 A1 | 5/2005 | Sato |
| 2005/0120389 A1 | 6/2005 | Boss et al. |
| 2005/0132401 A1 | 6/2005 | Boccon-Gibod et al. |
| 2005/0166224 A1 | 7/2005 | Ficco |
| 2005/0198661 A1 | 9/2005 | Collins et al. |
| 2005/0210145 A1 | 9/2005 | Kim et al. |
| 2005/0251820 A1 | 11/2005 | Stefanik et al. |
| 2005/0251827 A1 | 11/2005 | Ellis et al. |
| 2005/0273807 A1* | 12/2005 | Nissing ............ H04N 21/8456 725/32 |
| 2006/0024034 A1 | 2/2006 | Filo et al. |
| 2006/0028951 A1 | 2/2006 | Tozun et al. |
| 2006/0064733 A1* | 3/2006 | Norton ............ H04N 21/8545 725/135 |
| 2006/0080167 A1 | 4/2006 | Chen et al. |
| 2006/0120624 A1 | 6/2006 | Jojic et al. |
| 2006/0150072 A1 | 7/2006 | Salvucci |
| 2006/0150216 A1 | 7/2006 | Herz et al. |
| 2006/0153537 A1 | 7/2006 | Kaneko et al. |
| 2006/0155400 A1 | 7/2006 | Loomis |
| 2006/0200842 A1 | 9/2006 | Chapman et al. |
| 2006/0222322 A1 | 10/2006 | Levitan |
| 2006/0224260 A1 | 10/2006 | Hicken et al. |
| 2006/0253330 A1 | 11/2006 | Maggio et al. |
| 2006/0274828 A1 | 12/2006 | Siemens et al. |
| 2007/0003149 A1 | 1/2007 | Nagumo et al. |
| 2007/0024706 A1 | 2/2007 | Brannon et al. |
| 2007/0033633 A1 | 2/2007 | Andrews et al. |
| 2007/0055989 A1 | 3/2007 | Shanks et al. |
| 2007/0079325 A1 | 4/2007 | de Heer |
| 2007/0085759 A1 | 4/2007 | Lee et al. |
| 2007/0099684 A1 | 5/2007 | Butterworth |
| 2007/0101369 A1 | 5/2007 | Dolph |
| 2007/0118801 A1 | 5/2007 | Harshbarger et al. |
| 2007/0154169 A1 | 7/2007 | Cordray et al. |
| 2007/0157234 A1 | 7/2007 | Walker |
| 2007/0157260 A1 | 7/2007 | Walker |
| 2007/0157261 A1 | 7/2007 | Steelberg et al. |
| 2007/0162395 A1 | 7/2007 | Ben-Yaacov et al. |
| 2007/0220583 A1 | 9/2007 | Bailey et al. |
| 2007/0226761 A1 | 9/2007 | Zalewski et al. |
| 2007/0239754 A1 | 10/2007 | Schnitman |
| 2007/0253677 A1 | 11/2007 | Wang |
| 2007/0253688 A1 | 11/2007 | Koennecke |
| 2008/0019223 A1* | 1/2008 | Bridges ............ G11B 27/031 369/30.01 |
| 2008/0021187 A1 | 1/2008 | Wescott et al. |
| 2008/0021874 A1* | 1/2008 | Dahl ............ G06F 17/30899 |
| 2008/0022320 A1 | 1/2008 | Ver Steeg |
| 2008/0031595 A1 | 2/2008 | Cho |
| 2008/0086456 A1 | 4/2008 | Rasanen et al. |
| 2008/0086754 A1 | 4/2008 | Chen et al. |
| 2008/0091721 A1* | 4/2008 | Harboe ............ G11B 27/34 |
| 2008/0092159 A1 | 4/2008 | Dmitriev et al. |
| 2008/0148152 A1 | 6/2008 | Blinnikka et al. |
| 2008/0161111 A1 | 7/2008 | Schuman |
| 2008/0170687 A1 | 7/2008 | Moors et al. |
| 2008/0177893 A1 | 7/2008 | Bowra et al. |
| 2008/0178232 A1 | 7/2008 | Velusamy |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0022165 A1 | 1/2009 | Candelore et al. |
| 2009/0024923 A1 | 1/2009 | Hartwig et al. |
| 2009/0029771 A1 | 1/2009 | Donahue |
| 2009/0055880 A1 | 2/2009 | Batteram et al. |
| 2009/0063681 A1 | 3/2009 | Ramakrishnan et al. |
| 2009/0063995 A1 | 3/2009 | Baron et al. |
| 2009/0077137 A1 | 3/2009 | Weda et al. |
| 2009/0079663 A1 | 3/2009 | Chang et al. |
| 2009/0083631 A1 | 3/2009 | Sidi et al. |
| 2009/0116817 A1 | 5/2009 | Kim et al. |
| 2009/0177538 A1 | 7/2009 | Brewer et al. |
| 2009/0178089 A1 | 7/2009 | Picco et al. |
| 2009/0191971 A1 | 7/2009 | Avent |
| 2009/0195652 A1 | 8/2009 | Gal |
| 2009/0199697 A1 | 8/2009 | Lehtiniemi et al. |
| 2009/0226046 A1 | 9/2009 | Shteyn |
| 2009/0228572 A1 | 9/2009 | Wall et al. |
| 2009/0254827 A1 | 10/2009 | Gonze et al. |
| 2009/0258708 A1 | 10/2009 | Figueroa |
| 2009/0265737 A1 | 10/2009 | Issa et al. |
| 2009/0265746 A1 | 10/2009 | Halen et al. |
| 2009/0297118 A1 | 12/2009 | Fink et al. |
| 2009/0320075 A1* | 12/2009 | Marko ............ H04H 20/40 725/56 |
| 2010/0017820 A1 | 1/2010 | Thevathasan et al. |
| 2010/0042496 A1 | 2/2010 | Wang et al. |
| 2010/0050083 A1* | 2/2010 | Axen ............ G11B 27/031 715/726 |
| 2010/0069159 A1 | 3/2010 | Yamada et al. |
| 2010/0070987 A1 | 3/2010 | Amento et al. |
| 2010/0077290 A1 | 3/2010 | Pueyo |
| 2010/0088726 A1 | 4/2010 | Curtis et al. |
| 2010/0122286 A1 | 5/2010 | Begeja et al. |
| 2010/0146145 A1 | 6/2010 | Tippin et al. |
| 2010/0153512 A1 | 6/2010 | Balassanian et al. |
| 2010/0153885 A1 | 6/2010 | Yates |
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0167819 A1 | 7/2010 | Schell |
| 2010/0186032 A1 | 7/2010 | Pradeep et al. |
| 2010/0186579 A1 | 7/2010 | Schnitman |
| 2010/0199299 A1 | 8/2010 | Chang et al. |
| 2010/0210351 A1 | 8/2010 | Berman |
| 2010/0251295 A1 | 9/2010 | Amento et al. |
| 2010/0257994 A1* | 10/2010 | Hufford ............ G10H 1/0025 84/609 |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |

(56) References Cited

U.S. PATENT DOCUMENTS

| | | |
|---|---|---|
| 2010/0293455 A1 | 11/2010 | Bloch |
| 2010/0325135 A1 | 12/2010 | Chen et al. |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0069940 A1 | 3/2011 | Shimy et al. |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0126106 A1* | 5/2011 | Ben Shaul ............... A63J 25/00 715/723 |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0169603 A1 | 7/2011 | Fithian et al. |
| 2011/0182366 A1 | 7/2011 | Frojdh et al. |
| 2011/0191684 A1 | 8/2011 | Greenberg |
| 2011/0191801 A1 | 8/2011 | Vytheeswaran |
| 2011/0193982 A1 | 8/2011 | Kook et al. |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0239246 A1 | 9/2011 | Woodward et al. |
| 2011/0246661 A1 | 10/2011 | Manzari et al. |
| 2011/0246885 A1 | 10/2011 | Pantos et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2011/0313859 A1 | 12/2011 | Stillwell et al. |
| 2011/0314030 A1 | 12/2011 | Burba et al. |
| 2012/0004960 A1 | 1/2012 | Ma et al. |
| 2012/0005287 A1 | 1/2012 | Gadel et al. |
| 2012/0011438 A1 | 1/2012 | Kim et al. |
| 2012/0017141 A1 | 1/2012 | Eelen et al. |
| 2012/0062576 A1 | 3/2012 | Rosenthal et al. |
| 2012/0081389 A1 | 4/2012 | Dilts |
| 2012/0089911 A1 | 4/2012 | Hosking et al. |
| 2012/0094768 A1 | 4/2012 | McCaddon et al. |
| 2012/0105723 A1 | 5/2012 | van Coppenolle et al. |
| 2012/0110618 A1 | 5/2012 | Kilar et al. |
| 2012/0110620 A1 | 5/2012 | Kilar et al. |
| 2012/0120114 A1 | 5/2012 | You et al. |
| 2012/0137015 A1 | 5/2012 | Sun |
| 2012/0147954 A1 | 6/2012 | Kasai et al. |
| 2012/0159541 A1 | 6/2012 | Carton et al. |
| 2012/0179970 A1 | 7/2012 | Hayes |
| 2012/0198412 A1 | 8/2012 | Creighton et al. |
| 2012/0213495 A1 | 8/2012 | Hafeneger et al. |
| 2012/0225693 A1 | 9/2012 | Sirpal et al. |
| 2012/0233631 A1 | 9/2012 | Geshwind |
| 2012/0246032 A1 | 9/2012 | Beroukhim et al. |
| 2012/0263263 A1 | 10/2012 | Olsen et al. |
| 2012/0308206 A1 | 12/2012 | Kulas |
| 2012/0317198 A1 | 12/2012 | Patton et al. |
| 2012/0324491 A1 | 12/2012 | Bathiche et al. |
| 2013/0003993 A1* | 1/2013 | Michalski ............... G06F 3/0482 381/119 |
| 2013/0021269 A1 | 1/2013 | Johnson et al. |
| 2013/0024888 A1 | 1/2013 | Sivertsen |
| 2013/0028446 A1 | 1/2013 | Krzyzanowski |
| 2013/0028573 A1 | 1/2013 | Hoofien et al. |
| 2013/0031582 A1 | 1/2013 | Tinsman et al. |
| 2013/0298146 A1 | 1/2013 | D'Alessandro |
| 2013/0033542 A1 | 2/2013 | Nakazawa |
| 2013/0036200 A1 | 2/2013 | Roberts et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0094830 A1 | 4/2013 | Stone et al. |
| 2013/0117248 A1 | 5/2013 | Bhogal et al. |
| 2013/0125181 A1 | 5/2013 | Montemayor et al. |
| 2013/0129304 A1 | 5/2013 | Feinson |
| 2013/0129308 A1 | 5/2013 | Karn et al. |
| 2013/0173765 A1 | 7/2013 | Korbecki |
| 2013/0177294 A1 | 7/2013 | Kennberg |
| 2013/0202265 A1 | 8/2013 | Arrasvuori et al. |
| 2013/0204710 A1 | 8/2013 | Boland et al. |
| 2013/0219425 A1 | 8/2013 | Swartz |
| 2013/0235152 A1 | 9/2013 | Hannuksela et al. |
| 2013/0235270 A1 | 9/2013 | Sasaki et al. |
| 2013/0254292 A1 | 9/2013 | Bradley |
| 2013/0259442 A1 | 10/2013 | Bloch et al. |
| 2013/0282917 A1 | 10/2013 | Reznik et al. |
| 2013/0290818 A1 | 10/2013 | Arrasvuori et al. |
| 2013/0328888 A1 | 12/2013 | Beaver et al. |
| 2013/0330055 A1 | 12/2013 | Zimmermann et al. |
| 2013/0335427 A1 | 12/2013 | Cheung et al. |
| 2014/0015940 A1 | 1/2014 | Yoshida |
| 2014/0019865 A1 | 1/2014 | Shah |
| 2014/0025620 A1 | 1/2014 | Greenzeiger et al. |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0046946 A2 | 2/2014 | Friedmann et al. |
| 2014/0078397 A1 | 3/2014 | Bloch et al. |
| 2014/0082666 A1 | 3/2014 | Bloch et al. |
| 2014/0085196 A1 | 3/2014 | Zucker et al. |
| 2014/0086445 A1 | 3/2014 | Brubeck et al. |
| 2014/0094313 A1 | 4/2014 | Watson et al. |
| 2014/0101550 A1 | 4/2014 | Zises |
| 2014/0105420 A1 | 4/2014 | Lee |
| 2014/0126877 A1 | 5/2014 | Crawford et al. |
| 2014/0129618 A1 | 5/2014 | Panie et al. |
| 2014/0136186 A1 | 5/2014 | Adami et al. |
| 2014/0152564 A1 | 6/2014 | Gulezian et al. |
| 2014/0156677 A1 | 6/2014 | Collins, III et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0210860 A1 | 7/2014 | Caissy |
| 2014/0219630 A1 | 8/2014 | Minder |
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0279032 A1 | 9/2014 | Roever et al. |
| 2014/0282013 A1 | 9/2014 | Amijee |
| 2014/0282642 A1 | 9/2014 | Needham et al. |
| 2014/0298173 A1 | 10/2014 | Rock |
| 2014/0314239 A1 | 10/2014 | Meyer et al. |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0020086 A1 | 1/2015 | Chen et al. |
| 2015/0033266 A1 | 1/2015 | Klappert et al. |
| 2015/0046946 A1 | 2/2015 | Hassell et al. |
| 2015/0058342 A1 | 2/2015 | Kim et al. |
| 2015/0063781 A1 | 3/2015 | Silverman et al. |
| 2015/0067596 A1 | 3/2015 | Brown et al. |
| 2015/0067723 A1 | 3/2015 | Bloch et al. |
| 2015/0070458 A1 | 3/2015 | Kim et al. |
| 2015/0104155 A1 | 4/2015 | Bloch et al. |
| 2015/0106845 A1 | 4/2015 | Popkiewicz et al. |
| 2015/0124171 A1 | 5/2015 | King |
| 2015/0154439 A1 | 6/2015 | Anzue et al. |
| 2015/0160853 A1 | 6/2015 | Hwang et al. |
| 2015/0179224 A1 | 6/2015 | Bloch et al. |
| 2015/0181271 A1 | 6/2015 | Onno et al. |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |

(56) References Cited

U.S. PATENT DOCUMENTS

| | | |
|---|---|---|
| 2015/0256861 A1 | 9/2015 | Oyman |
| 2015/0258454 A1 | 9/2015 | King et al. |
| 2015/0293675 A1 | 10/2015 | Bloch et al. |
| 2015/0294685 A1 | 10/2015 | Bloch et al. |
| 2015/0304698 A1 | 10/2015 | Redol |
| 2015/0318018 A1 | 11/2015 | Kaiser et al. |
| 2015/0331485 A1 | 11/2015 | Wilairat et al. |
| 2015/0331933 A1 | 11/2015 | Tocchini, IV et al. |
| 2015/0331942 A1 | 11/2015 | Tan |
| 2015/0348325 A1 | 12/2015 | Voss |
| 2016/0009487 A1 | 1/2016 | Edwards et al. |
| 2016/0021412 A1 | 1/2016 | Majeed et al. |
| 2016/0037217 A1 | 1/2016 | Seok et al. |
| 2016/0057497 A1 | 2/2016 | Kim et al. |
| 2016/0062540 A1 | 3/2016 | Yang et al. |
| 2016/0065831 A1 | 3/2016 | Howard et al. |
| 2016/0066051 A1 | 3/2016 | Caidar et al. |
| 2016/0086585 A1 | 3/2016 | Sugimoto |
| 2016/0094875 A1 | 3/2016 | Peterson et al. |
| 2016/0099024 A1 | 4/2016 | Gilley |
| 2016/0100226 A1 | 4/2016 | Sadler et al. |
| 2016/0104513 A1 | 4/2016 | Bloch et al. |
| 2016/0132203 A1 | 5/2016 | Seto et al. |
| 2016/0142889 A1 | 5/2016 | O'Connor et al. |
| 2016/0162179 A1 | 6/2016 | Annett et al. |
| 2016/0170948 A1 | 6/2016 | Bloch |
| 2016/0173944 A1 | 6/2016 | Kilar et al. |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0232579 A1 | 8/2016 | Fahnestock |
| 2016/0277779 A1 | 9/2016 | Zhang et al. |
| 2016/0303608 A1 | 10/2016 | Jossick |
| 2016/0321689 A1 | 11/2016 | Turgeman |
| 2016/0322054 A1 | 11/2016 | Bloch et al. |
| 2016/0323608 A1 | 11/2016 | Bloch et al. |
| 2016/0337691 A1 | 11/2016 | Prasad et al. |
| 2016/0365117 A1 | 12/2016 | Boliek et al. |
| 2016/0366454 A1 | 12/2016 | Tatourian et al. |
| 2017/0006322 A1 | 1/2017 | Dury et al. |
| 2017/0041372 A1 | 2/2017 | Hosur |
| 2017/0062012 A1 | 3/2017 | Bloch et al. |
| 2017/0142486 A1 | 5/2017 | Masuda |
| 2017/0178409 A1 | 6/2017 | Bloch et al. |
| 2017/0178601 A1 | 6/2017 | Bloch et al. |
| 2017/0195736 A1 | 7/2017 | Chai et al. |
| 2017/0264920 A1 | 9/2017 | Mickelsen |
| 2017/0286424 A1 | 10/2017 | Peterson |
| 2017/0289220 A1 | 10/2017 | Bloch et al. |
| 2017/0295410 A1 | 10/2017 | Bloch et al. |
| 2017/0326462 A1 | 11/2017 | Lyons et al. |
| 2017/0337196 A1 | 11/2017 | Goela et al. |
| 2017/0345460 A1 | 11/2017 | Bloch et al. |
| 2018/0007443 A1 | 1/2018 | Cannistraro et al. |
| 2018/0014049 A1 | 1/2018 | Griffin et al. |
| 2018/0025078 A1 | 1/2018 | Quennesson |
| 2018/0048831 A1 | 2/2018 | Berwick et al. |
| 2018/0068019 A1 | 3/2018 | Novikoff et al. |
| 2018/0115592 A1 | 4/2018 | Samineni |
| 2018/0130501 A1 | 5/2018 | Bloch et al. |
| 2018/0176573 A1 | 6/2018 | Chawla et al. |
| 2018/0191574 A1 | 7/2018 | Vishnia et al. |
| 2018/0254067 A1 | 9/2018 | Elder |
| 2018/0262798 A1 | 9/2018 | Ramachandra |
| 2018/0314959 A1 | 11/2018 | Apokatanidis et al. |
| 2019/0069038 A1 | 2/2019 | Phillips |
| 2019/0069039 A1 | 2/2019 | Phillips |
| 2019/0075367 A1 | 3/2019 | van Zessen et al. |
| 2019/0090002 A1 | 3/2019 | Ramadorai et al. |
| 2019/0098371 A1 | 3/2019 | Keesan |
| 2019/0132639 A1 | 5/2019 | Panchaksharaiah et al. |
| 2019/0166412 A1 | 5/2019 | Panchaksharaiah et al. |
| 2019/0182525 A1 | 6/2019 | Steinberg et al. |
| 2019/0238719 A1 | 8/2019 | Alameh et al. |
| 2019/0335225 A1 | 10/2019 | Fang et al. |
| 2019/0354936 A1 | 11/2019 | Deluca et al. |
| 2020/0023157 A1 | 1/2020 | Lewis et al. |
| 2020/0037047 A1 | 1/2020 | Cheung et al. |
| 2020/0344508 A1 | 10/2020 | Edwards et al. |

FOREIGN PATENT DOCUMENTS

| | | |
|---|---|---|
| DE | 10053720 A1 | 4/2002 |
| EP | 0965371 | 12/1999 |
| EP | 1033157 A2 | 9/2000 |
| EP | 2104105 A1 | 9/2009 |
| GB | 2359916 A | 9/2001 |
| GB | 2428329 A | 1/2007 |
| JP | 2003-245471 A | 9/2003 |
| JP | 2008005288 A | 1/2008 |
| KR | 20040005068 | 1/2004 |
| KR | 20100037413 | 4/2010 |
| WO | 1996/13810 | 5/1996 |
| WO | WO-2000/059224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/052009 A2 | 5/2008 |
| WO | WO-2008/057444 A2 | 5/2008 |
| WO | WO-2009125404 A2 | 10/2009 |

OTHER PUBLICATIONS

U.S. Appl. No. 15/703,462 Published as US20180130501, Systems and Methods for Dynamic Video Bookmarking, filed Sep. 13, 2017.
U.S. Appl. No. 14/700,845 Published as US2016/0323608, Systems and Methods for Nonlinear Video Playback Using Linear Real-Time Video Players, filed Apr. 30, 2015.
U.S. Appl. No. 14/835,857 Published as US2017/0062012, Systems and Methods for Adaptive and Responsive Video, filed Aug. 26, 2015.
U.S. Appl. No. 15/085,209 Published as US-2017/0289220, Media Stream Rate Synchronization, filed Mar. 30, 2016.
U.S. Appl. No. 15/189,931 U.S. Pat. No. 10,218,760 Published as US 2017-0374120, Dynamic Summary Generation for Real-time Switchable Video, filed Jun. 22, 2016.
U.S. Appl. No. 15/395,477 Published as US 2018-0191574, Systems and Methods for Dynamic Weighting of Branched Video Paths, filed Dec. 30, 2016.
U.S. Appl. No. 15/863,191, Dynamic Library Display, filed Mar. 5, 2018.
U.S. Appl. No. 15/481,916, the Office Actions dated Aug. 6, 2018, Oct. 6, 2017 and Mar. 8, 2019.
U.S. Appl. No. 14/249,665, now U.S. Pat. No. 9,792,026, the Office Actions dated May 16, 2016 and Feb. 22, 2017; and the Notice of Allowance dated Jun. 2, 2017.
U.S. Appl. No. 14/884,285, the Office Actions dated Oct. 5, 2017 and Jul. 26, 2018.
U.S. Appl. No. 14/534,626, the Office Actions dated Nov. 25, 2015, Jul. 5, 2016, Jun. 5, 2017, Mar. 2, 2018 and Sep. 26, 2018.
U.S. Appl. No. 14/700,845, the Office Actions dated May 20, 2016, Dec. 2, 2016, May 22, 2017, Nov. 28, 2017, Jun. 27, 2018 and Feb. 19, 2019.
U.S. Appl. No. 14/835,857, the Office Actions dated Sep. 23, 2016, Jun. 5, 2017, Aug. 9, 2018; the Advisory Action dated Oct. 20, 2017; and Notice of Allowance dated Feb. 25, 2019.
U.S. Appl. No. 12/706,721 U.S. Pat. No. 9,190,110 Published as US2010/0293455, System and Method for Assembling a Recorded Composition, filed Feb. 17, 2010.
U.S. Appl. No. 14/884,285 Published as US2017/0178601, Systems and Method for Assembling a Recorded Composition, filed Oct. 15, 2015.
U.S. Appl. No. 13/033,916 U.S. Pat. No. 9,607,655 Published as US2011/0200116, System and Method for Seamless Multimedia Assembly, filed Feb. 24, 2011.
U.S. Appl. No. 13/034,645 Published as US2011/0202562, System and Method for Data Mining Within Interactive Multimedia, filed Feb. 24, 2011.

(56) References Cited

OTHER PUBLICATIONS

U.S. Appl. No. 13/437,164 U.S. Pat. No. 8,600,220 Published as US2013/0259442, Systems and Methods for Loading More Than One Video Content at a Time, filed Apr. 2, 2012.
U.S. Appl. No. 14/069,694 U.S. Pat. No. 9,271,015 Published as US2014/0178051, Systems and Methods for Loading More Than One Video Content at a Time, filed Nov. 1, 2013.
U.S. Appl. No. 13/622,780 U.S. Pat. No. 8,860,882 Published as US2014/0078397, Systems and Methods for Constructing Multimedia Content Modules, filed Sep. 19, 2012.
U.S. Appl. No. 13/622,795 U.S. Pat. No. 9,009,619, Published as US2014/0082666, Progress Bar for Branched Videos, filed Sep. 19, 2012.
U.S. Appl. No. 14/639,579 U.S. Pat. No. 10,474,334 Published as US2015/0199116, Progress Bar for Branched Videos, filed Mar. 5, 2015.
U.S. Appl. No. 13/838,830 U.S. Pat. No. 9,257,148 Published as US2014/0270680, System and Method for Synchronization of Selectably Presentable Media Streams, filed Mar. 15, 2013.
U.S. Appl. No. 14/984,821 U.S. Pat. No. 10,418,066 Published as US2016/0217829, System and Method for Synchronization of Selectably Presentable Media Streams, filed Dec. 30, 2015.
U.S. Appl. No. 13/921,536 U.S. Pat. No. 9,832,516 Published as US2014/0380167, Systems and Methods for Multiple Device Interaction with Selectably Presentable Media Streams, filed Jun. 19, 2013.
U.S. Appl. No. 14/107,600 U.S. Pat. No. 10,448,119 Published as US2015/0067723, Methods and Systems for Unfolding Video Pre-Roll, filed Dec. 16, 2013.
U.S. Appl. No. 14/335,381 U.S. Pat. No. 9,530,454 Published as US2015/0104155, Systems and Methods for Real-Time Pixel Switching, filed Jul. 18, 2014.
U.S. Appl. No. 14/139,996 U.S. Pat. No. 9,641,898 Published as US2015/0181301, Methods and Systems for In-Video Library, filed Dec. 24, 2013.
U.S. Appl. No. 14/140,007 U.S. Pat. No. 9,520,155 Published as US2015/0179224, Methods and Systems for Seeking to Non-Key Frames, filed Dec. 24, 2013.
U.S. Appl. No. 14/249,627 9,653,115 Published as US 2015-0294685, Systems and Methods for Creating Linear Video From Branched Video, filed Apr. 10, 2014.
U.S. Appl. No. 15/481,916 Published as US 2017-0345460, Systems and Methods for Creating Linear Video From Branched Video, filed Apr. 7, 2017.
U.S. Appl. No. 16/986,977 Published as US 2020/0365187, Systems and Methods for Creating Linear Video From Branched Video, filed Aug. 6, 2020.
U.S. Appl. No. 14/249,665 U.S. Pat. No. 9,792,026 Published as US2015/0293675, Dynamic Timeline for Branched Video, filed Apr. 10, 2014.
U.S. Appl. No. 14/509,700 9,792,957 Published as US2016/0104513, Systems and Methods for Dynamic Video Bookmarking, filed Oct. 8, 2014.
U.S. Appl. No. 14/534,626 Published as US-2018-0130501-A1, Systems and Methods for Dynamic Video Bookmarking, filed Sep. 13, 2017.
U.S. Appl. No. 14/534,626 Published as US2016/0105724, Systems and Methods for Parallel Track Transitions, filed Nov. 6, 2014.
U.S. Appl. No. 14/700,845 U.S. Pat. No. 10,582,265 Published as US2016/0323608, Systems and Methods for Nonlinear Video Playback Using Linear Real-Time Video Players, filed Apr. 30, 2015.
U.S. Appl. No. 16/752,193 Published as US2020/0404382, Systems and Methods for Nonlinear Video Playback Using Linear Real-Time Video Players, filed Jan. 24, 2020.
U.S. Appl. No. 14/700,862 U.S. Pat. No. 9,672,868 Published as US2016/0322054, Systems and Methods for Seamless Media Creation, filed Apr. 30, 2015.
U.S. Appl. No. 14/835,857 U.S. Pat. No. 10,460,765 Published as US2017/0062012, Systems and Methods for Adaptive and Responsive Video, filed Aug. 26, 2015.

U.S. Appl. No. 14/978,464 Published as US2017/0178601, Intelligent Buffering of Large-Scale Video, filed Dec. 22, 2015.
U.S. Appl. No. 14/978,491 U.S. Pat. No. 11,128,853 Published as US2017/0178409, Seamless Transitions in Large-Scale Video, filed Dec. 22, 2015.
U.S. Appl. No. 17/403,703, Seamless Transitions in Large-Scale Video, filed Aug. 16, 2021.
U.S. Appl. No. 15/085,209 U.S. Pat. No. 10,462,202 Published as US2017/0289220, Media Stream Rate Synchronization, filed Mar. 30, 2016.
U.S. Appl. No. 15/165,373 Published as US 2017-0295410, Symbiotic Interactive Video, filed May 26, 2016.
U.S. Appl. No. 15/189,931 U.S. Pat. No. 10,218,760 Published as US 2017/0374120, Dynamic Summary Generation for Real-time Switchable Videos, filed Jun. 22, 2016.
U.S. Appl. No. 15/395,477 U.S. Pat. No. 11,050,809 Published as US 2018/0191574, Systems and Methods for Dynamic Weighting of Branched Video Paths, filed Dec. 30, 2016.
U.S. Appl. No. 15/997,284 Published as US 2019/0373330, Interactive Video Dynamic Adaptation and User Profiling, filed Jun. 4, 2018.
U.S. Appl. No. 15/863,191 U.S. Pat. No. 10,257,578, Dynamic Library Display for Interactive Videos, filed Jan. 5, 2018.
U.S. Appl. No. 16/283,066 U.S. Pat. No. 10,856,049 Published as US2019/0349637, Dynamic Library Display for Interactive Videos, filed Feb. 22, 2019.
Google Scholar search, "Inserting metadata inertion advertising video", Jul. 16, 2021, 2 pages.
International Preliminary Report and Written Opinion of PCT/IL2012/000080 dated Aug. 27, 2013, 7 pages.
Marciel, M. et al., "Understanding the Detection of View Fraud in Video Content Portals", (Feb. 5, 2016), Cornell University, pp. 1-13.
U.S. Appl. No. 15/356,913, Systems and Methods for Real-Time Pixel Switching, dated Nov. 21, 2016.
U.S. Appl. No. 14/249,627 U.S. Pat. No. 9,653,115 Published as US 2015-0294685, Systems and Methods for Creating Linear Video From Branched Video, filed Apr. 10, 2014.
U.S. Appl. No. 16/986,977, Systems and Methods for Creating Linear Video From Branched Video, filed Aug. 6, 2020.
U.S. Appl. No. 14/509,700 U.S. Pat. No. 9,792,957 Published as US2016/0104513, Systems and Methods for Dynamic Video Bookmarking, filed Oct. 8, 2014.
U.S. Appl. No. 16/865,896, Systems and Methods for Dynamic Video Bookmarking, filed May 4, 2020.
U.S. Appl. No. 14/534,626, Published as U52016/0105724, Systems and Methods for Parallel Track Transitions, filed Nov. 6, 2014.
U.S. Appl. No. 16/752,193 Systems and Methods for Nonlinear Video Playback Using Linear Real-Time Video Players, filed Jan. 24, 2020.
U.S. Appl. No. 16/559,082 Published as US2019/0392868, Systems and Methods for Adaptive and Responsive Video, filed Sep. 3, 2019.
U.S. Appl. No. 16/800,994, Systems and Methods for Adaptive and Responsive Video, filed Feb. 25, 2020.
U.S. Appl. No. 14/978,491 Published as US2017/0178409, Seamless Transitions in Large-Scale Video, filed Dec. 22, 2015.
U.S. Appl. No. 12/706,721, now U.S. Pat. No. 9,190,110, the Office Actions dated Apr. 26, 2012, Aug. 17, 2012, Mar. 28, 2013, Jun. 20, 2013, Jan. 3, 2014, Jul. 7, 2014, and Dec. 19, 2014; the Notices of Allowance dated Jun. 19, 2015, Jul. 17, 2015, Jul. 29, 2015, Aug. 12, 2015, and Sep. 14, 2015.
U.S. Appl. No. 14/884,284, the Office Actions dated Sep. 8, 2017; May 18, 2018; Dec. 14, 2018; Jul. 25, 2019; Nov. 18, 2019 and Feb. 21, 2020.
U.S. Appl. No. 13/033,916, now U.S. Pat. No. 9,607,655, the Office Actions dated Jun. 7, 2013, Jan. 2, 2014, Aug. 28, 2014, Jan. 5, 2015, Jul. 9, 2015, and Jan. 5, 2016; the Advisory Action dated May 11, 2016; and the Notice of Allowance dated Dec. 21, 2016.
U.S. Appl. No. 13/034,645, the Office Actions dated Jul. 23, 2012, Mar. 21, 2013, Sep. 15, 2014, Jun. 4, 2015, Apr. 7, 2017, Oct. 6, 2017, Aug. 10, 2018, Jul. 5, 2016, Apr. 5, 2019 and Dec. 26, 2019.
U.S. Appl. No. 13/437,164, now U.S. Pat. No. 8,600,220, the Notice of Allowance dated Aug. 9, 2013.

(56) References Cited

OTHER PUBLICATIONS

U.S. Appl. No. 14/069,694, now U.S. Pat. No. 9,271,015, the Office Actions dated Apr. 27, 2015 and Aug. 31, 2015, the Notice of Allowance dated Oct. 13, 2015.
U.S. Appl. No. 13/622,780, now U.S. Pat. No. 8,860,882, the Office Action dated Jan. 16, 2014, the Notice of Allowance dated Aug. 4, 2014.
U.S. Appl. No. 13/622,795, now U.S. Pat. No. 9,009,619, the Office Actions dated May 23, 2014 and Dec. 1, 2014, the Notice of Allowance dated Jan. 9, 2015.
U.S. Appl. No. 14/639,579, now U.S. Pat. No. 10,474,334, the Office Actions dated May 3, 2017, Nov. 22, 2017 and Jun. 26, 2018, the Notices of Allowance dated Feb. 8, 2019 and Jul. 11, 2019.
U.S. Appl. No. 13/838,830, now U.S. Pat. No. 9,257,148, the Office Action dated May 7, 2015, Notices of Allowance dated Nov. 6, 2015.
U.S. Appl. No. 14/984,821, now U.S. Pat. No. 10,418,066, the Office Actions dated Jun. 1, 2017, Dec. 6, 2017, and Oct. 5, 2018; the Notice of Allowance dated May 7, 2019.
U.S. Appl. No. 13/921,536, now U.S. Pat. No. 9,832,516, the Office Actions dated Feb. 25, 2015, Oct. 20, 2015, Aug. 26, 2016 and Mar. 8, 2017, the Advisory Action dted Jun. 21, 2017, and Notice of Allowance dated Sep. 12, 2017.
U.S. Appl. No. 14/107,600, now U.S. Pat. No. 10,448,119, the Office Actions dated Dec. 19, 2014, Jul. 8, 2015, Jun. 3, 2016, Mar. 8, 2017, Oct. 10, 2017 and Jul. 25, 2018, and the Notices of Allowance dated Dec. 31, 2018 and Apr. 25, 2019.
U.S. Appl. No. 14/335,381, now U.S. Pat. No. 9,530,454, the Office Action dated Feb. 12, 2016; and the Notice of Allowance dated Aug. 24, 2016.
U.S. Appl. No. 14/139,996, now U.S. Pat. No. 9,641,898, the Office Actions dated Jun. 18, 2015, Feb. 3, 2016 and May 4, 2016; and the Notice of Allowance dated Feb. 23, 2016.
U.S. Appl. No. 14/140,007, now U.S. Pat. No. 9,520,155, the Office Actions dated Sep. 8, 2015 and Apr. 26, 2016; and the Notice of Allowance dated Oct. 11, 2016.
U.S. Appl. No. 14/249,627, now U.S. Pat. No. 9,653,115, the Office Actions dated Jan. 14, 2016 and Aug. 9, 2016; and the Notice of Allowance dated Jan. 13, 2017.
U.S. Appl. No. 15/481,916, the Office Actions dated Oct. 6, 2017, Aug. 6, 2018, Mar. 8, 2019, Nov. 27, 2019, and the Notice of Allowance dated Apr. 21, 2020.
U.S. Appl. No. 14/249,665, now U.S. Pat. No. 9,792,026, the Office Actions dated May 16, 2016 and Feb. 22, 2017; and the Notices of Allowance dated Jun. 2, 2017 and Jul. 24, 2017.
U.S. Appl. No. 14/509,700, now U.S. Pat. No. 9,792,957, the Office Action dated Oct. 28, 2016; and the Notice of Allowance dated Jun. 15, 2017.
U.S. Appl. No. 15/703,462, the Office Action dated Jun. 21, 2019, and Dec. 27, 2019; and the Notice of Allowance dated Feb. 10, 2020 and May 14, 2020.
U.S. Appl. No. 14/534,626, the Office Actions dated Nov. 25, 2015, Jul. 5, 2016, Jun. 5, 2017, Mar. 2, 2018, Sep. 26, 2018, May 8, 2019, Dec. 27, 2019, and Aug. 19, 2020.
U.S. Appl. No. 14/700,845, now U.S. Pat. No. 9,653,115, the Office Actions dated May 20, 2016, Dec. 2, 2016, May 22, 2017, Nov. 28, 2017, Jun. 27, 2018 and Feb. 19, 2019 and the Notice of Allowance dated Oct. 21, 2019.
U.S. Appl. No. 14/700,862, now U.S. Pat. No. 9,672,868, the Office Action dated Aug. 26, 2016; and the Notice of Allowance dated Mar. 9, 2017.
U.S. Appl. No. 14/835,857, now U.S. Pat. No. 10,460,765, the Office Actions dated Sep. 23, 2016, Jun. 5, 2017 and Aug. 9, 2018, and the Advisory Action dated Oct. 20, 2017; Notice of Allowances dated Feb. 25, 2019 and Jun. 7, 2019.

U.S. Appl. No. 16/559,082, the Office Actions dated Feb. 2, 2020 and Jul. 23, 2020.
U.S. Appl. No. 16/800,994, the Office Action dated Apr. 15, 2020.
U.S. Appl. No. 14/978,464, the Office Actions dated Jul. 25, 2019, Dec. 14, 2018, May 18, 2018, Sep. 8, 2017, Dec. 14, 2018, Jul. 25, 2019, Nov. 18, 2019 and Jul. 23, 2020.
U.S. Appl. No. 14/978,491, the Office Actions dated Sep. 8, 2017, May 25, 2018, Dec. 14, 2018, Aug. 12, 2019, Dec. 23, 2019 and Jul. 23, 2020.
U.S. Appl. No. 15/085,209, now U.S. Patent No. 10,462,202, the Office Actions dated Feb. 26, 2018 and Dec. 31, 2018; the Notice of Allowance dated Aug. 12, 2019.
U.S. Appl. No. 15/165,373, the Office Actions dated Mar. 24, 2017, Oct. 11, 2017, May 18, 2018, Feb. 1, 2019, Aug. 8, 2019, Jan. 3, 2020 and Jun. 11, 2020.
U.S. Appl. No. 15/189,931, now U.S. Pat. No. 10,218,760, the Office Action dated Apr. 6, 2018, and the Notice of Allowance dated Oct. 24, 2018.
U.S. Appl. No. 15/395,477, the Office Actions dated Nov. 2, 2018, Aug. 16, 2019, and Apr. 15, 2019.
U.S. Appl. No. 15/997,284, the Office Actions dated Aug. 1, 2019, Nov. 21, 2019, and Apr. 28, 2020.
U.S. Appl. No. 15/863,191, now U.S. Pat. No. 10/257,578, the Notices of Allowance dated Jul. 5, 2018 and Nov. 23, 2018.
U.S. Appl. No. 16/283,066, the Office Action dated Jan. 6, 2020; and.
U.S. Appl. No. 16/591,103, the Office Action dated Apr. 22, 2020.
An ffmpeg and SDL Tutorial, "Tutorial 05: Synching Video," Retrieved from internet on Mar. 15, 2013: <http://dranqer.com/ffmpeg/tutorial05.html>, (4 pages).
Archos Gen 5 English User Manual Version 3.0, Jul. 26, 2007, p. 1-81.
Barlett, Mitch, (Oct. 6, 2008) "iTunes 11: How to Queue Next Song," *Technipages*, pp 1-8, retrieved on Dec. 26, 2013 from the Internet http://www.technipages.com/itunes-queue-next-song.html.
International Search Report for International Application PCT/IL2010/000362 dated Aug. 25, 2010.
International Search Report and Written Opinion for International Patent Application PCT/IB2013/001000 dated Jul. 31, 2013 (11 pages).
International Search Report for International Patent Application PCT/IL2012/000080 dated Aug. 9, 2012 (4 pages).
International Search Report for International Patent Application PCT/IL2012/00081 dated Jun. 28, 2012 (4 pages).
ITunes 11: How to Queue Next Song, Published Oct. 6, 2008, pp. 1-8.
Labs.byHook: "Ogg Vorbis Encoder for Flash: Alchemy Series Part 1," [Online] Internet Article, Retrieved on Dec. 17, 2012 from the Internet: URL:http://labs.byhook.com/2011/02/15/ogg-vorbis-encoder-for-flash-alchem-y-series-part-1/, 2011, (6pages).
Miller, Gregor et al., (Sep. 3, 2009) "MiniDiver: A Novel Mobile Media Playback Interface for Rich Video Content on an iPhoneTM", *Entertainment Computing A ICEC 2009*, pp. 98-109.
Sodagar, I., (2011) "The MPEG-DASH Standard for Multimedia Streaming Over the Internet", *IEEE Multimedia*, IEEE Service Center, New York, NY US, vol. 18, No. 4, pp. 62-67.
Supplemental Search Report for PCT/IL2010/000362 dated Jun. 28, 2012.
Supplemental European Search Report for EP13184145 dated Jan. 30, 2014 (5 pages).
Yang, H, et al., "Time Stamp Synchronization in Video Systems," Teletronics Technology Corporation, <http://www.ttcdas.com/products/daus encoders/pdf tech papers/tp 2010 time stamp video system.pdf>, Abstract, (8 pages).

\* cited by examiner

PRESENTING AN INDICATION A PRE-DEFINED FIRST SEGMENT OF SEVERAL VARIATIONS OF A WORK — 800

ACCEPTING A SELECTION OF ONE OF THE VARIATIONS OF THE FIRST SEGMENT — 802

INDENTIFYING VARIATIONS FOR INCLUSION AS A SECOND SEGMENT BASED ON THE SELECTION THAT WAS MADE BY THE USER FOR THE FIRST SEGMENT — 804

FIG. 9

DEFINING A START POINT AND / OR AN END POINT FOR ONE OR MORE SEGMENTS OF A WORK — 900

PRESENTING AN INDICATION OF VARIATIONS FOR ONE OR MORE OF THE SEGMENTS — 902

ACCEPTING A VARIATION FROM AMONG THE PRESENTED VARIATIONS — 904

ADDING THE SELECTED VARIATION TO PRIOR OR SUBSEQUENT VARIATIONS TO CREATE A NEW WORK BASED ON THE SELECTED VARIATIONS — 906

SYSTEM AND METHOD FOR ASSEMBLING A RECORDED COMPOSITION

CROSS-REFERENCE TO RELATED APPLICATIONS

This application is a continuation of U.S. patent application Ser. No. 12/706,721, filed on Feb. 17, 2010, and entitled "System and Method for Assembling a Recorded Composition," which claims priority to Israeli Patent Application No. 198717, filed on May 12, 2009, the entireties of which are hereby incorporated by reference.

FIELD OF THE INVENTION

The present invention generally relates to assembling a version of an audio or video recording, and may for example allow compilation of a version of a composition from segments of various recorded versions or variations of one or more compositions.

BACKGROUND OF THE INVENTION

Artists such as singers, film producers or videographers may record and make available more than one version of a particular composition, or multiple variations of a part of a composition. Such versions may include for example an acoustic version of a song, an electric or synthesized version of the same song, a hip-hop version, a classical version, etc. Similarly, various artists may record and make available their own cover versions of the same song. Other artists may wish to create a composition that may include certain variations of parts of the original composition, or of parts of variations of similar or different compositions.

SUMMARY OF THE INVENTION

An embodiment of the invention may include a system having a memory to store data representing a first version of a composition and a second version of the same composition, where each of such versions is divided into segments, and each of such segments includes a pre-defined portion of the composition, and the system also includes a processor to assemble a third version of the composition out of the first segment of the first version and the second segment of the second version. The third version may be stored in a memory that is associated with the processor, such that data representing the third version can be recalled to play the third version.

Is some embodiments the processor may issue a signal in advance, such as in advance of a time of a completion of a display or playing of the first segment of the first version, where the signal alerts a user that the first segment is about to finish and that the user may select a second segment to be combined with, assembled onto or linked to the first segment. A signal may also be issued by the processor to indicate that the second segment of the second version may linked to the first segment of the first version.

In some embodiments, a processor may present an indication, such as a visual indication, that the first segment of the new version was taken from the first segment of the first version, and the second segment of the new version was taken from the second version. Such indication, such as the visual indication may include an indication of a mode of the first segment and a mode of the second segment.

In some embodiments, the linking or association of the segments may include linking a set of data that represent or embody the first version to a set of data that embody the second version. In some embodiments the linking of the segments may preserve in the new version a musical flow of the composition or work.

In some embodiments, a processor may modify a duration of the second version to approximate a duration of the first version.

Some embodiments of the invention may include a method that designates a segmentation break at a pre-defined point in each of several versions of a composition, and accepts an instruction from a user to alter at the segmentation break a display of a first of versions of the composition and to continue from the segmentation break point a display of the second version of the composition.

In some embodiments, the instruction may be recorded to associate the instruction with the first versions and the second version.

In some embodiments, the method may include presenting a visual or audio display of an indication of a segmentation break in advance of a display of the pre-defined point of the first segment; and displaying an indication of the second versions that is suitable to be associated with the pre-defined point of the first version.

In some embodiments, a processor may modify a duration of the second version to match a duration of the first versions Some embodiments of the invention may include a method that presents to a user an indication of recordings of a composition, where each of the recordings includes a segmentation indication at a pre-defined point of the composition, and the method links at the pre-defined point of the composition, a set of stored data that represents a first segment of a first of recording of the composition, to stored data that represents a second segment of a second recording of the composition, and the method stores as a new recording, a set of data representing the first segment linked of the second segment.

In some embodiments, the method may issue to the user a signal in advance of the pre-defined point of the composition, where the signal indicates to the user possible selection of a second segment of one or more other versions of the work that may be linked to the first segment.

Some embodiments of the invention may include a method that presents a visual representation corresponding to first segments of various versions of a composition, where the method includes accepting a selection of a first segment from among the various first segments, presenting a various possible immediately subsequent segments of the various versions of the work, accepting from a user a selection from among the various immediately subsequent presented segments, appending the selected subsequent segment to the first segment, repeating the process of presenting, selecting and appending of subsequent segments of the composition until an entire duration of the composition is assembled. In some embodiments, a processor may select a default segment from a version to be appended to the version if a user fails to select another segment to be appended to the version being assembled.

Some embodiments of the invention may include a method that presents to a user possible pre-defined variations for a first segment of a work, and that accepts a selection from among the presented first segments of the work, and that identifies a second set of pre-defined variations for a second segment of the work, where the second set is based, or is a derivative of the selection that was made by the user for the first segment. The method may accept a selection from among the set of pre-defined variations for the second segment of the work, and may associate the selection from the first set with the selection from the second set.

Some embodiments of the invention may include a method that defines a start point and an end point for a segment in a work, that presents an indication of variations of the work that may be inserted as a segment of in a new version of the work, that accepts a selection made by a user from among the possible variations of the work to be inserted as a segment in a new version of the work and that inserts data representing the selected variation as a segment in the new version of the work.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

DETAILED DESCRIPTION OF THE PREFERRED EMBODIMENTS

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

An embodiment of the invention may be practiced through the execution of instructions that may be stored on an article such as a disc, memory device or other mass data storage article. Such instructions may be for example loaded into a processor and executed. The instructions may be stored in a memory of a computer as a client executed application. Such client executed application may store links to segments of music or video or may store data representing music or video. An application may be executed by a processor, and segments of data representing music, sound, images or video may be manipulated in accordance with instructions that may be stored in a memory and that may be are associated with such segments.

When used in this paper, the terms "composition" or "work", may, in addition to their regular definition, refer to a song, musical opus, video presentation, audio recording, film, movie, advertisement or other collection of audio and or audio plus visual signals that are assembled into a work that has identifiable components. For example, a composition may refer to a song having stanzas and verses, or bars and phrases, where in general, stanzas are linked to or follow verses, and verses are linked to or follow stanzas. The terms "mode" or "version" of a composition may, in addition to its regular definition, refer to a style or identifiable characteristic of a particular recording of a given composition, or a recoding made or sung by a particular artist. For example, a given song, video, speech or film may be recorded in an acoustic version, an electric version, a hip-hop version, a jazz version or other versions. The same song or video may be recorded by various artists or combination of artists in their own respective versions. In some embodiments, each of such versions may include all of the components of the particular composition, such as all or most of the stanzas, verses, notes or scenes of the composition. Typically, the information or data manipulated in embodiments of the invention is one or more audio recordings of compositions or works.

When used in this paper, a "segment" may in addition to its regular meaning, refer to a pre-defined portion of a work or composition, or a interval of either a defined or undefined period during a work or composition that may be set off with a start time at a certain point during the composition, and/or an end time during the composition, at which point another segment of the composition may begin or at which point a non-segmented portion of the composition may resume. In some embodiments, a segment may refer to a space or blank during a song or composition into which space or blank a variation may be inserted.

When used in this paper, a "progression of a recording" may refer to a scale or measure of the progress of a recording relative to its complete play. For example, a progression may refer to an elapsed time or period of a recording, as such time or period may be initiated from a beginning or end of a recording. In some embodiments, a progression may refer to a point in a series of musical notes, lyrics, images or other known events or markers in each of two or more recordings of the composition. For example, if the notes or lyrics or a musical or audio composition are known, a progression of the recording may include a tracking of the notes played or heard in one or more versions of the recording. A progression may be consistent between two or more versions of a recording such that a point in a progression of a first version may be tracked and associated with a corresponding point on a second version.

When used in this paper, the term "variation" may, in addition to its regular meaning, mean a portion of a song, movie, clip, or advertisement that may be inserted into or combined with one or more other portions of a song, movie or clip at a pre-defined point in the song, movie or clip. A variation may include lyrics, music, images or music that are different from the original song, movie or clip into which the variation is being added, and that are different from the other variations. A variation may be differentiated from a version in that while a version will generally be or include the same work that is being sung or played in a different way, a variation may be or include a different lyric, song or beat but that may be related to the original song or to the other segments to which the variation may be added by the fact that it is musically similar or creates a musically, lyrically or visually desired effect when it is combined with the other segments to which it is added.

In some embodiments, various versions of the same composition, each assembled as discussed herein, may be recorded and made available for users or consumers to select from, depending on their taste, mood or other preference.

Figure 1:
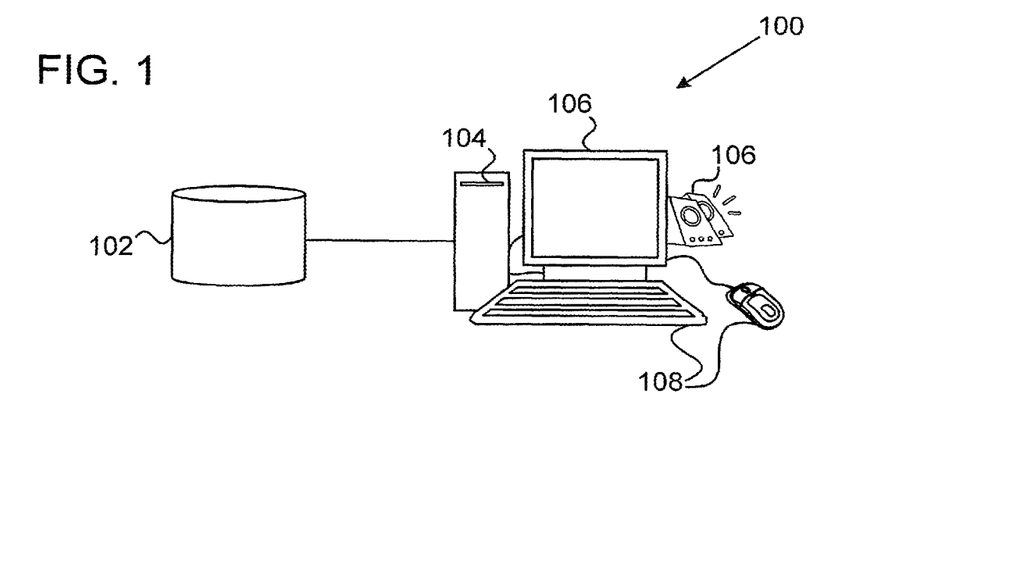
FIG. 1 is a conceptual illustration of a system in accordance with an embodiment the invention.

Reference is made to FIG. 1, a conceptual illustration of a system in accordance with an embodiment of the invention. In some embodiments, system 100 may include for example a memory 102 such as a magnetic storage device, flash, RAM or other electronic storage device suitable for mass storage of data such as digital or analog audio or video data. In some embodiments, one or more segments of memory 102 may be divided or structured into a data base or other structured format that may associate one or more data entries in memory 102 with one or more other data entries in memory 102. In some embodiments, structured data may be stored or accessible by reference to for example, a mark up language such as for example, XML (Extensible Markup Language) or other mark up languages. System 100 may also include a processor 104 such as a processor suitable for digital signal processing, encoding and decoding of large data streams and for large-scale data manipulations such as image processing. Processor 104 may include more than one processor such as for example a controller, CPU or a video processor that may operate for example in parallel or in other configurations. System 100 may also include one or more display or output device 106, such as speakers or a video display, and an input device 108 such as a key-board, mouse, microphone touch screen or other input device 108.

In operation, processor 104 may execute code such as music or video playback code (e.g., stored in storage 102), which inputs music or video data (e.g. also stored in storage 102) and cause music to be output from an output device 106 (e.g. a speaker) and/or video to be output from an output device 106 (e.g. a monitor or display). Processor 104 may execute code to carry out methods as disclosed herein.

In operation, memory 102 may be loaded with or store two or more versions of a composition such as a song or video. Each of the recorded and stored versions may be marked, or divided into segments, where each such segment represents or is associated with a known portion of the composition. The beginning or ending markings of such segments may not be visible or audible, but may designate or set-off the start and/or end the segment.

A user may be presented with a selection of versions of the composition, and may choose a first version that is to be played. At some point in the progression of the first chosen version, the user may select a segment of second version of the recording that is to be inserted as part of a new version of the recording that the user is creating. Processor 104 may identify the segment most closely fitting the user's selection, and may copy or insert the selected segment of the second version into the version of the composition that the user is creating. This process may be repeated until all of the segments of the recoding are included in the user's new version.

The user may in this way, select a first stanza or segment of, for example, a song in an acoustic mode, a second stanza from an electric mode and a cadence from a jazz mode. In some embodiments the segments may be combined seamlessly so that beat, rhythm, pitch and other musical characteristics are retained in the movement from a segment in one mode to a segment in another mode and so that a complete, uninterrupted and seamless version of the new version is created that includes a segment from the acoustic version, a segment from the electric version and a cadence from the jazz version.

In some embodiments, segments may divide all or some of the recorded versions of a composition, such that a first segment of each of the rock, acoustic and jazz version of a composition may include only a first stanza or other pre-defined portion of the composition in each of the versions. The second segment in each of the same rock, acoustic and jazz versions may include only the first stanza of the composition. Subsequent segments may include for example subsequent stanzas or verses, instrumental portions, cadences or other portions of the composition. Parallel segments in each of the versions may thereby define particular portions of the composition. For example, a fifth segment in each of the rock and acoustic versions may point to and include for example the twelfth through fifteen line of the song or video that is the subject of both of the recorded versions. In some embodiments, the segment markers or set off points may be loaded into for example a mark-up data language such as an XML format, and the segments of many recorded versions may be associated with or linked to each other.

In some embodiments, a play speed of one or more versions of a recording may be altered so that the total duration of the various versions of the composition from which segments may be chose, may be relatively or approximately uniform. Such alterations of play speed may be performed with tools such as Ableton Live™, Qbase™ software products or other suitable audio recording tools Each of the respective first, second, third, and nth markers, break points or segment set-off points of all of the recorded versions of a particular recording may therefore uniformly point to the identical or corresponding portions of the recorded work. Such uniform definition of the segments may allow the segments, when combined, to create a musically seamless or continuously flowing work without the need for a user to make further adjustments to links between the segments. For example, a user may select a first segment from a first version, a second through fourth segment from a second version and a final segment from the first version, and such segments may be combined by the processor to create a seamlessly flowing version of the recording.

In some embodiments, a version may contain many or even hundreds of defined segments so that a processor 104 may locate a segment point that is close to any point in the recording even if the user did not issue a signal to switch segments at the precise timing or location of a segmentation point.

In some embodiments, a system may store the various segments (or pointers to such segments) that were selected by a user from two or more versions, and may replay the segments as a new version created by a user. In this way, users may create new versions of a known recording by assembling pieces of various versions of the recording.

Figure 2:
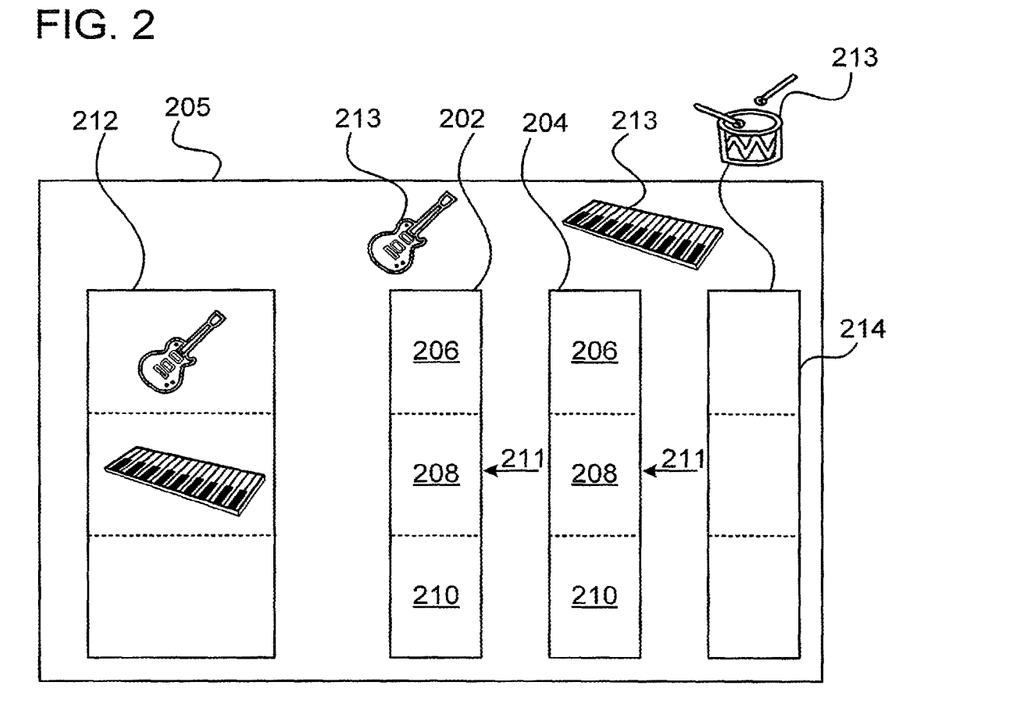
FIG. 2 is a conceptual illustration of segments of various versions of a composition and possible combinations of such segments into a created version of the composition in accordance with an embodiment of the invention.

Reference is made to FIG. 2, a conceptual illustration of a display of versions and segments of versions of a composition in accordance with an embodiment of the invention. A display may present a representation of a first version 202 and a second version 204 of a recording by way of for example a graphic user interface 205 (e.g., displayed on a monitor such as a output device 106), and may indicate graphically, the mode of each of the displayed versions 202 and 204, and the location (by way of for example a graphic arrow or marker 211) in a progression of the recording of the various segments 206, 208 and 210 that are defined in the versions. For example, a particular version may be labeled with a name, icon 213 or avatar that may represent the version or the artist who performed the version.

A recording may begin to play by way of a video and for audio output, and the display may indicate to a user the progress of the playing of the version of the recording on a display. In advance of reaching for example an end of a defined segment 208, the display may indicate an upcoming decision point wherein the user may decide which, if any, of the possible choices of segments 208 from other versions 204 may be inserted into the version that he is creating. For example, such advance notice may be displayed or presented to a user by way of a user interface or by a sound indication, for example a few seconds before the end of the segment that is then playing or being shown. In some embodiments, a display of a countdown may be added to indicate to the user the point on the recording by which he must make his selection during the course of the play of the then current version. In advance of the decision point, a display of the possible alternative segments 208 from versions 204 and 214 that may be selected may be provided to the user, and such display may hover and then disappear when the decision point passes or a selection of a new segment 208 has been made.

In some embodiments, if no selection of an alternative segment is made by a user, the default action may be set to continue playing the version that is then progressing. Other defaults may be used such as for example randomly altering versions at one or more segment breaks. If a selection of a segment from another version 214 is made, the graphic display may indicate the new version then being played, and may for example highlight or otherwise show the path of the various segments that have been selected for inclusion in the new version and the current version being played.

In some embodiments, the path or segments from versions that have been selected may be displayed for the user, and stored to show and retain the new version created by the user. The segments may be joined to create an original version of the recoding consisting of various segments of assorted versions of the composition.

In some embodiments, a user may download or otherwise import into a client or other application the versions from which selections of segments may be made. In some embodiments, no such downloading may be required, and instead a reference, such as an HTML (HyperText Markup Language) site, to segments of various versions that are stored remotely, may be presented to the user, and the user may store his newly created version by storing in a memory such references to the remotely stored versions. In some embodiments, the application may detect the bandwidth that is available on the user's computer as well as the speed of the recording, and may store or download the appropriate amount of data to facilitate smooth playback. In some embodiments, the user's created version 212 may also be stored remotely and made available to other users who may for example download version 212 to a computer or other device, use segments of such user's version 212 to create their own new versions, or other uses.

The client or application may include control functions such as for example play, pause, rewind, volume and other common controls for audio and video recording or playing.

Figure 3:
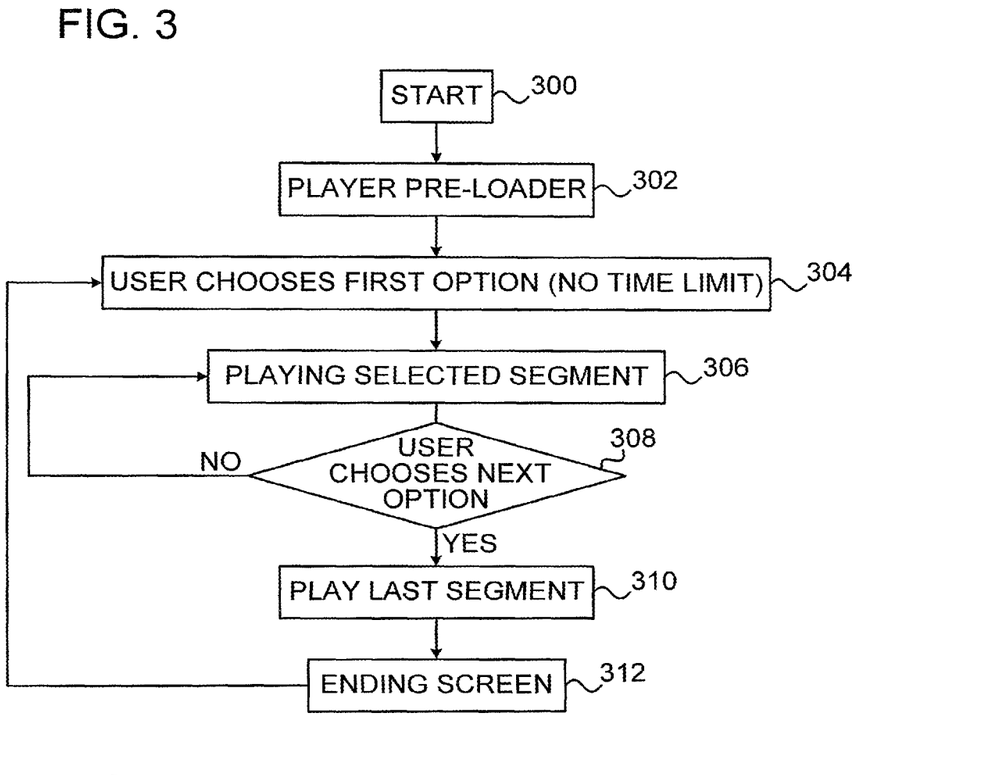
FIG. 3 is a flow diagram of a method in accordance with an embodiment of the invention.

Reference is made to FIG. 3, a flow diagram of a method in accordance with an embodiment of the invention. In block 300 a user may be presented with a start screen where for example the user may select the recording and two more versions of the recording that may be available. In some embodiments, various characteristics, data and descriptions of the recording and the version may be loaded into the application and may be displayed, r played back or presented. In block 302, the player or client software that is stored in a memory may be pre-loaded with at least some of, or portions of the initial segments of the various versions of the recording, as were selected by the user. In block 304 the user may select the version for the first segment from which the recording is to begin, and the first segment of such version may become the first segment in the user's new version. In block 306, the selected segment may be played for the user, and portions of the upcoming segments that may be selected by a user at the next decision point may be pre-loaded or buffered into the application. In block 308, if the segment then being played is not the last segment of the recording, one or more versions of the subsequent segment or segments may be presented to the user for his selection. In block 310, the process of presenting and selecting segments of a recoding may continue until the last segment of the recording is reached. In block 312, an ending screen may be presented to a user where the summary of the selected and assembled segments are displayed or played, and the user may be prompted to save, share, upload or otherwise use the newly created version. In some embodiments, such final version may be stored in a memory associated or connected with a client that may run an application executing an embodiment of the invention. In some embodiments, the process of selecting segments and adding such selected segments to the song as it plays may be made in real time and while the song is playing for the user.

Figure 4:
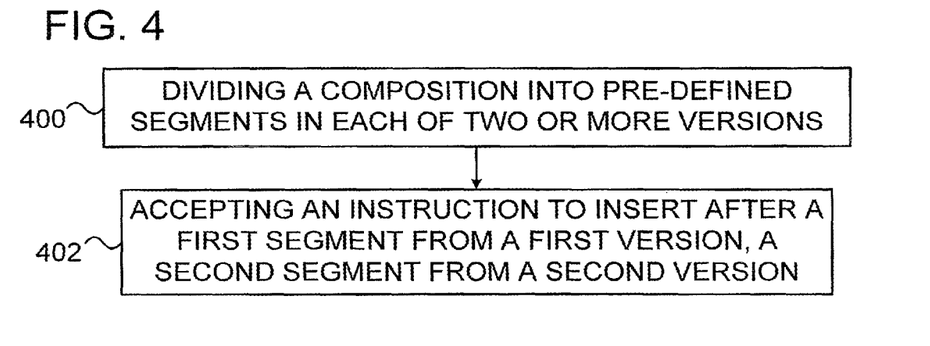
FIG. 4 is a flow diagram of a method in accordance with an embodiment of the invention.

Reference is made to FIG. 4, a flow diagram of a method in accordance with an embodiment of the invention. In block 400, there is presented an indication of versions of a composition, where each such version includes segmentation marks at each of a number of pre-defined points. In block 402, a segment from a first version is joined at one of the pre-defined points to a segment from a second version. In block 404, there is stored or recorded an indication of the joined segments from each of the versions and an indication of the segmentation point at which such segments were joined.

In some embodiments, a signal, such as a displayed or audio signal on a user interface, may be issued in advance of the end of segment, to alert the user that the current segment will soon be completed and that he will have an opportunity to change or alter the flow of his newly created version by substituting a segment from a different version that the one he is now using. If the user does not input a signal for such substitution, then the display may default to continue showing or playing the version then being played or may choose a random version to add to the segments that were already assembled.

In some embodiments, there may be presented to a user an indication of which segments from among the various versions are suitable for being assembled onto the version then being played. For example, at a particular point in a song, a piano instrumental may be heard, and a display may show that another version of the song includes a guitar instrumental that can break up the piano instrumental and that can be inserted after the piano instrumental. The display may also indicate that a cappella version of the song may not be suitable or appropriate for insertion at such point.

In some embodiments, a display may be presented that shows the origin or the various segments that have been assembled into the newly created version. For example, a graphic or icon of a guitar may be overlaid onto a graphical display representing a first segment of the user's newly created version to show that that the source of the segment is an electric guitar version or a hip-hop mode or version of the recording. The icon or graphic of the segment as incorporated into the newly created version may be similar to or identical with the icon or graphic of the version that was the origin of the segment. An avatar of a particular singer may be overlaid onto a second segment to show that such second segment was taken from a version performed by the particular singer.

In some embodiments, a process of assembling the various segments may include linking an end of the first segment with a start of the second segment while maintaining a musical flow of the newly created version. For example, the segments may be linked to maintain a beat, key, tone, pitch or other characteristics of one or more of the original versions. In some embodiments the linking, moving, connecting or manipulating of segments may be accomplished by manipulating data that when processed through a player may reproduce music, sounds, images or video. Representations or links to such segments of data that represent the music or image may be stored, displayed, manipulated or processed.

In some embodiments, a processor may accept a signal from a user at various points in the course of the play or display of a version of the composition, even if such points are not associated with a defined break point or segmentation point. The processor may then select the closest or otherwise most suitable break point or segmentation point for that can be used to alter the flow of the play to substitute the then current segment for a segment selected by the user In some embodiments, a processor may modify a duration of various versions of a composition so that such durations are approximate the same.

In some embodiments, one or more artists or composers may record multiple variations of one or more segments of a song or music video. For example, a segment of a love song may be recorded in the masculine, as a man singing about a woman, or in the feminine, as a woman singing about a man, such that in the first variation of a segment, the song is about "her eyes", and in the second variation of the segment the song is about "his smile", Another segment may be recorded in a first variation where a man and a woman break up and never see each other, in a second variation of the segment where the man and the woman break up but then get back together again, and in a third variation of the segment where the man and the woman break up and the woman returns to demolish the man's ear. Other variations and permutations of segments may be recorded and presented to a user to create possible story lines that may be combined to weave different plots, song settings, genders or other factors in a song or music video. A user may select a first segment from among the first segment variations, and combine that segment with a second segment from among the second segment variations, and may continue combining segments into a song that carries a different plot, setting, ending or one or more other factors that are unlike any of the existing songs that were recorded by the artist. All of the segment variations may be of pre-defined length or have pre-defined starting and/or ending points at which each of such segment variations may be joined with one or more other segments.

In some embodiments, a variation may be inserted at a pre-defined starting point or break point (n), but may end at one of among several subsequent pre-defined ending points (n+2, n+3, etc.), rather than at the next break point (n+1). In this way, a long variation may be added in a spot that would otherwise have been filled with a shorter variation. In some embodiments, the various segments that may be combined may not share a particular melody, duration, tempo, musical arrangement or other pre-defined characteristics, except for a designation by the system of a pre-defined beginning and/or end to the particular segment, and that an end to a first segment is to be followed by a beginning of one from among various second or subsequent segments.

Figure 5:
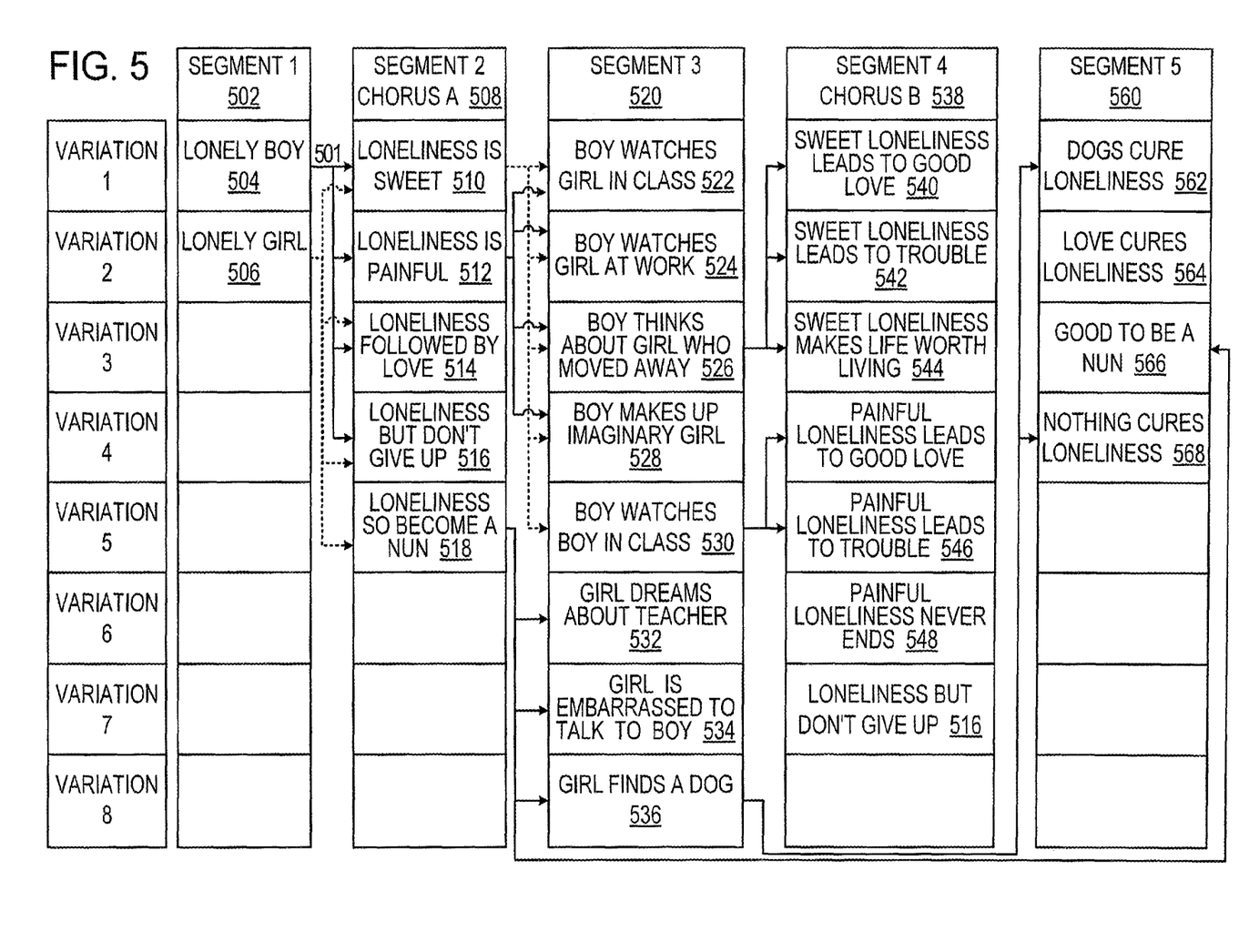
FIG. 5 is a flow diagram of multiple variations of segments of a composition, and possible connections between the variations, in accordance with an embodiment of the invention

Reference is made to FIG. 5, a conceptual diagram of possible variations of a series of segments that may be constructed into a song or music video by for example an application in accordance with an embodiment of the invention. For example, in a first segment 502, a user may be presented with two variations from which he may choose, a first variation 504 is a stanza about a lonely boy, and a second variation 506 is a stanza about a lonely girl. If a user selects segment 504 as a first segment in the construction of his song or video, then the system will limit, define or present to the user that only variations 510 through 516 in segment 2 508 are suitable to follow selected variation 504 of segment 1 502 that can follow. In FIG. 5, the suitability of variations that may follow a selected variation are shown as solid lines 501. As shown in FIG. 5, variation 518 may not be suitable to follow variation 504, and a user will therefore not be presented with variation 518 as a possible variation to follow variation 506. If a user first selects variation 504 as his selection for segment 1 502, and then selects variation 510 as his choice for segment 2 508, the system may present variations 522 to 530 to the user for possible selection as segment 3 520. This process of presentation, selection of possible variations and choice by the user may be continued until for example a variation has been selected for all of the segments. In some embodiments, a variation need not be chosen for each segment. For example, if a user chooses variation 506 for segment 1 502, and then chooses variation 518 as a selection for segment 508, the user may then be presented with variation 566 as a final selection for the user's song, such that the user will have selected only three segments that are to be constructed into a song or video. In some embodiments, a variation in a prior segment may be re-used or presented again as a possible choice in a subsequent segment. For example, variation 516 may be presented as a possible choice for segment 2 508, and may be presented again as a possible choice for segment 4, such that a variation may be re-used in multiple segments in a work. In some embodiments, a use of a variation 516 in segment 4 538 may be associated with different variations in segment 5 560 to account for the use of variation 516 twice or to account for the placement of variation 516 near the end of the work.

In some embodiments, a user may be presented with a selection of variations for one or more segments, and may choose a first variation that is to be played or assembled. At a certain point during the segment or after the segment ends, the user may select a variation for the second segment as part of a new version of the recording that the user is creating. A processor may identify one or more segments that closely fit the user's selection and that match or are musically compatible with the then just-ended segment. The processor may assemble the selected or closely fitting segment after the then just-ended segment. This process may be repeated until some or all of the segments of the recoding have been selected in the user's new version. As part of the selection process, the processor may match musical characteristics of one or more previously selected segments to the possible segments that may be selected by the user in subsequent segments. Such assistance by the processor may increase the musical quality of the assembled segments. In some embodiments, a user may be presented with the relative quality of the match between assembled segments or variations that are presented for possible assembly. For example, a processor may compare any or all or rhythm, pitch, timing or other characteristics of variations and indicate to a user which of the variations includes characteristics that would match the segments already assembled.

In some embodiments, a user may select a variation to be inserted in a segment even after the pre-defined insertion point has passed in the playing of the song. In such case, the variation to be inserted may be stored and played in the point designated for insertion in a next playing of the composition. In some embodiments, a selection variation may be associated with one or more next variations from which a user may select to follow the selected variation.

In some embodiments, a system may randomly select variations for insertion into some or all of the segments.

In some embodiments, segment 1 502, may not be the start of a song, video, work or recording, but may represent the first spot or space in a recorded work that is available for insertion by a user of a selected variation. For example, a user may be presented with a first stanza of the song "Mary Had a Little Lamb", where such first stanza includes the usual lyrics. The user may be presented with several variations of a first segment, that is actually the second stanza of the work, where such variations include different music, lyrics, tempo, etc. Similarly, the user may be presented with multiple variations of a third stanza from which to choose. Finally, the system may insert a final stanza without giving the user a choice of variations from which to choose.

In another embodiment, a system may present to a user a recoding of the song "Happy Birthday", and may designate a start point for a segment that starts with the end of "Happy Birthday dear". A user may be presented with an assortment of recordings of names from which may be selected a recording of a sung name that will be inserted into the segment. The end of the inserted segment may be the end of the recorded name, and the recorded work may continue with "Happy Birthday to you". The newly created work may include the recorded first part, the selected segment, and the recorded ending.

In some embodiments, the assembled variation, or signals associated with the assembled variations, may be stored. The assembled variations in the form of a newly created work may be played, stored or distributed. In some embodiments, the assembled segments may constitute a newly created musical composition.

Figure 6:
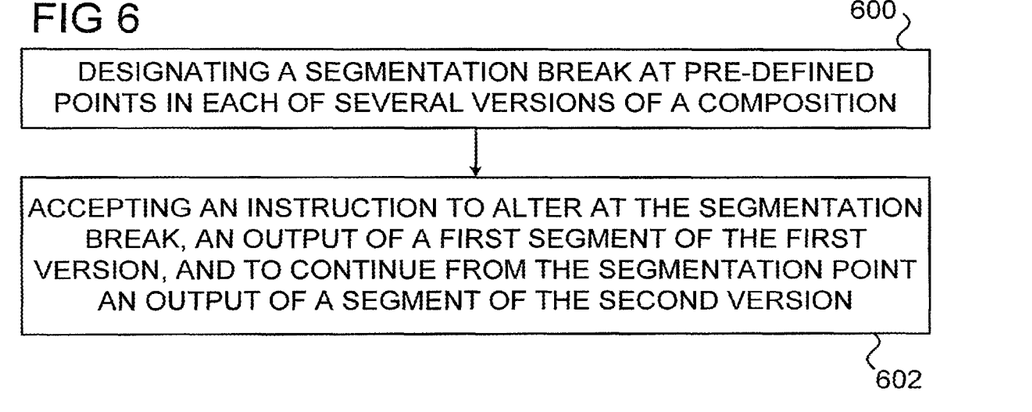
FIG. 6 is a flow diagram of a method in accordance with an embodiment of the invention.

Reference is made to FIG. 6, a flow chart of a method in accordance with an embodiment of the invention. In block 600, there may be designated a segmentation break at a pre-defined point in each of a several versions of a composition. In block 602, an instruction may be accepted from, for example a user, to alter at the segmentation break, an output of a first segment of the first version, and to continue from the segmentation point an output of a segment of the second version.

Figure 7:
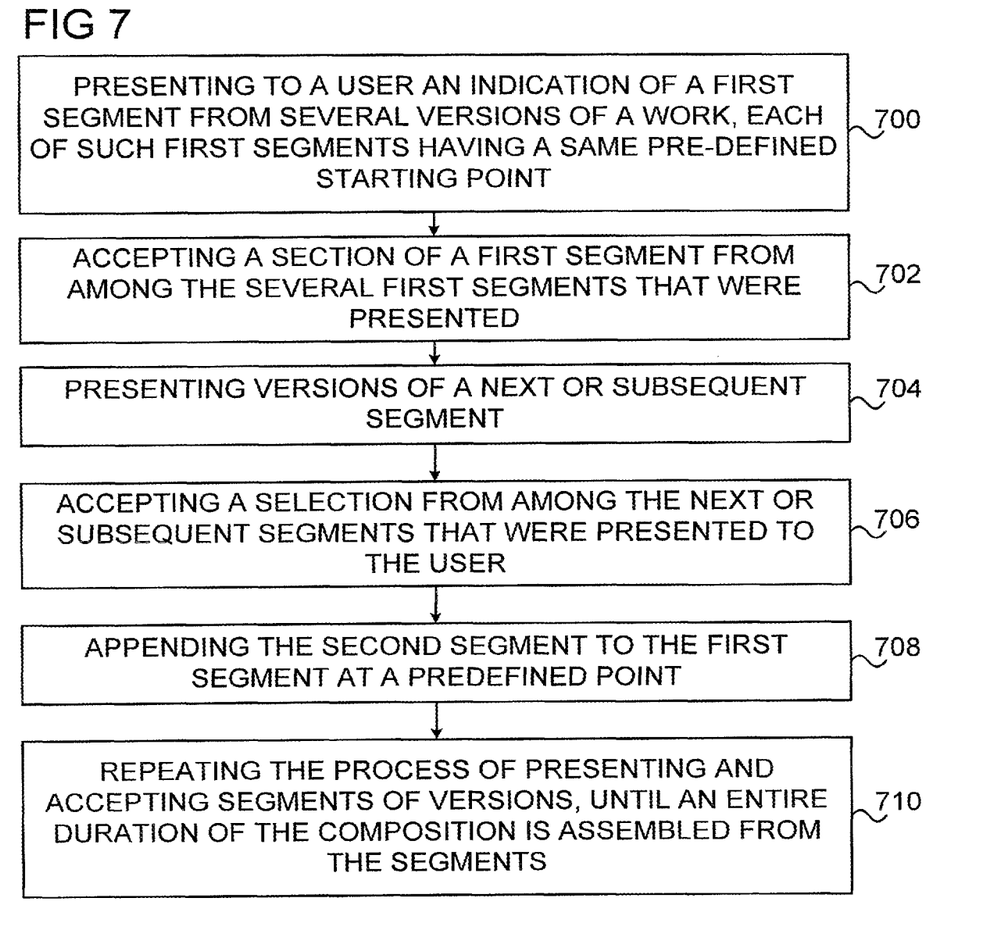
FIG. 7 is a flow diagram of a method in accordance with an embodiment of the invention.

Reference is made to FIG. 7, a flow chart of a method in accordance with an embodiment of the invention. In block 700, there may be presented to a user an indication of a first segment for several versions of a work, where each of such first segments has a same pre-defined start point. In block 702, there may be accepted from a user by for example a processor a selection of a first segment from among the several first segments that were presented from the versions. In block 704, there may be presented to for example a user several versions of a next or subsequent segment for one or more of the versions that were presented for the first segment. In block 706, there may be accepted from the user a selection from among the next or subsequent segments that were presented to the user. In block 708, the selected first segment may be appended, assembled or attached to the second segment at a predefined point so that a musical quality of the combination of the two segments is maintained. In block 710 the process of presenting segments of versions, accepting a selection of a segment and appending the selected segment to the prior segment may be repeated until an entire duration of the composition is assembled from the segments.

Figure 8:
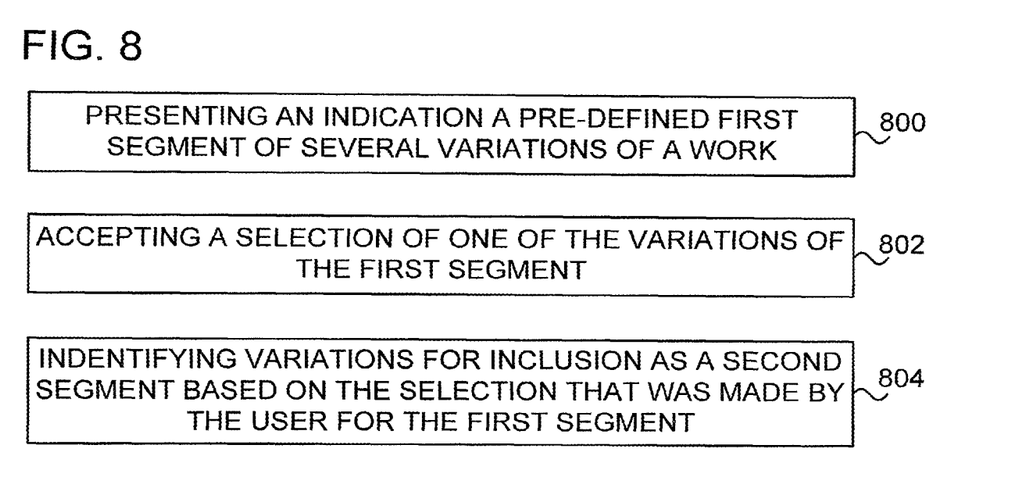
FIG. 8 is a flow diagram of a method in accordance with an embodiment of the invention.

Reference is made to FIG. 8, a flow chart of a method in accordance with an embodiment of the invention. In block 800, there may be presented to a user an indication a pre-defined first segment of several variations of a work. In block 802, a processor may accept from for example a user a selection of one of the variations of the first segment. In block 804, the processor may select or identify several variations for inclusion as a second segment based on the selection that was made by the user for the first segment. For example, if a selected first segment is from a hip-hop version, the processor may present to the user various second segments that also have hip-hop sounds from different artists, or may include portions of different hip-hop songs from the same artist. In some embodiments, the processor may also present an indication of a relative suitability of the various presented second segments in light of the selected first segment, where from said first plurality for said first segment of said work.

Figure 9:
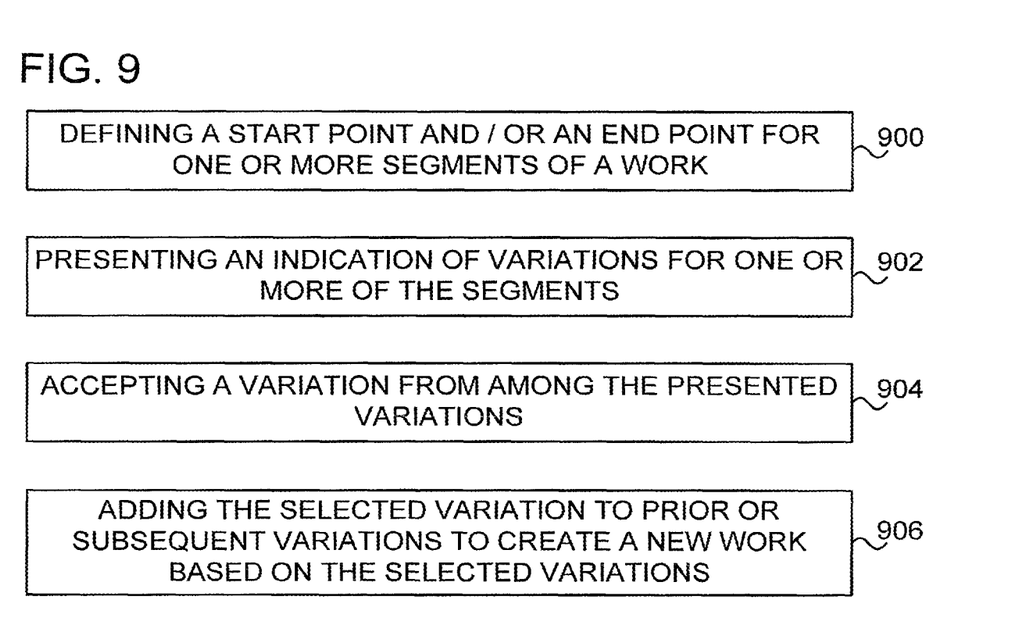
FIG. 9 is a flow diagram of a method in accordance with an embodiment of the invention.

Reference is made to FIG. 9, a flow chart of a method in accordance with an embodiment of the invention. In block 900, a start point and or an end point for one or more segments of a work may be defined in a recording of the work. In block 902, an indication of several variations for one or more of the segments may be presented to a user. In block 904, a selection may be accepted for a variation from among the presented variations. In block 906, the selected variation may be added, combined or inserted into prior or subsequent variations to create a new work based on the selected variations.

It will be appreciated by persons skilled in the art that embodiments of the invention are not limited by what has been particularly shown and described hereinabove. Rather the scope of at least one embodiment of the invention is defined by the claims below.

We claim:
1. A method comprising:
providing a video presentation comprising a plurality of predefined paths corresponding to different versions of a video, each predefined path comprising a plurality of seamlessly joined video segments, wherein a first video segment of the plurality of video segments comprises a decision period;

during a first playback of the video during a first time period:

during playback of the first video segment and within the decision period, providing a visual representation of a first set of options, each option in the first set of options being associated with a different video segment in a first subset of the video segments, the first subset of video segments corresponding to a first subset of predefined paths of the plurality of predefined paths; and receiving a first decision selecting one of the options in the first set of options; and during a second playback of the video during a second time period, later than the first time period, upon reaching the decision period of the first video segment:

modifying the first set of options, based on the first decision selecting one of the options in the first set of options during the first playback of the video, to create a second set of options, the second set of options comprising at least one option included in the first set of options and at least one option not included in the first set of options;

providing a visual representation of the second set of options, each option in the second set of options being associated with a different video segment in a second subset of the video segments, the second subset of video segments corresponding to a second subset of predefined paths of the plurality of predefined paths, the second subset of predefined paths being different than the first subset of predefined paths;

receiving a second decision selecting one of the options in the second set of options, the selected option in the second set of options being associated with a next video segment to play following the first video segment; and seamlessly presenting the next video segment following the first video segment.

2. The method of claim 1, wherein at least one of the seamlessly joined video segments is included in two or more of the predefined paths.

3. The method of claim 1, wherein the decision period comprises a portion of playback time of the first video segment.

4. The method of claim 3, wherein the decision period comprises a predefined start time and a predefined end time within the playback time of the first video segment.

5. The method of claim 1, wherein the decision is one of received from a user and automatically determined.

6. The method of claim 1, further comprising presenting each of the video segments in a particular one of the predefined paths to provide a seamless version of the video.

7. The method of claim 1, further comprising providing, during playback of the first video segment and within the decision period, visual representations of one or more of the video segments in the first subset of video segments.

8. The method of claim 7, further comprising removing from display one or more of the visual representations following an end of the decision period.

9. The method of claim 1, further comprising storing decisions made by a user at a plurality of decision points during the first and/or second playback of the video presentation.

10. The method of claim 9, further comprising making available the stored decisions of the user to other users.

11. A system comprising:

at least one memory for storing computer-executable instructions; and at least one processor for executing the instructions stored on the at least one memory, wherein execution of the instructions programs the at least one processor to perform operations comprising:

providing a video presentation comprising a plurality of predefined paths corresponding to different versions of a video, each predefined path comprising a plurality of seamlessly joined video segments, wherein a first video segment of the plurality of video segments comprises a decision period;

during a first playback of the video during a first time period:

during playback of the first video segment and within the decision period, providing a visual representation of a first set of options, each option in the first set of options being associated with a different video segment in a first subset of the video segments, the first subset of video segments corresponding to a first subset of predefined paths of the plurality of predefined paths; and receiving a first decision selecting one of the options in the first set of options; and during a second playback of the video during a second time period, later than the first time period, upon reaching the decision period of the first video segment:

modifying the first set of options, based on the first decision selecting one of the options in the first set of options during the first playback of the video, to create a second set of options, the second set of options comprising at least one option included in the first set of options and at least one option not included in the first set of options;

providing a visual representation of the second set of options, each option in the second set of options being associated with a different video segment in a second subset of the video segments, the second subset of video segments corresponding to a second subset of predefined paths of the plurality of predefined paths, the second subset of predefined paths being different than the first subset of predefined paths;

receiving a second decision selecting one of the options in the second set of options, the selected option in the second set of options being associated with a next video segment to play following the first video segment; and seamlessly presenting the next video segment following the first video segment.

12. The system of claim 11, wherein at least one of the seamlessly joined video segments is included in two or more of the predefined paths.

13. The system of claim 11, wherein the decision period comprises a portion of playback time of the first video segment.

14. The system of claim 13, wherein the decision period comprises a predefined start time and a predefined end time within the playback time of the first video segment.

15. The system of claim 11, wherein the decision is one of received from a user and automatically determined.

16. The system of claim 11, wherein the operations further comprise presenting each of the video segments in a particular one of the predefined paths to provide a seamless version of the video.

17. The system of claim 11, wherein the operations further comprise providing, during playback of the first video segment and within the decision period, visual representations of one or more of the video segments in the first subset of video segments.

18. The system of claim 17, wherein the operations further comprise removing from display one or more of the visual representations following an end of the decision period.

19. The system of claim 11, wherein the operations further comprise storing decisions made by a user at a plurality of decision points during the first and/or second playback of the video presentation.

20. The system of claim 19, wherein the operations further comprise making available the stored decisions of the user to other users.

* * * * *